United States Patent
Miyagi et al.

(10) Patent No.: US 11,354,580 B2
(45) Date of Patent: Jun. 7, 2022

(54) NON-TRANSITORY COMPUTER-READABLE STORAGE MEDIUM, TRAINING DATA GENERATION APPARATUS, AND TRAINING DATA GENERATION METHOD

(71) Applicant: FUJITSU LIMITED, Kawasaki (JP)

(72) Inventors: Toshihide Miyagi, Kawasaki (JP); Kota Yamakoshi, Ota (JP); Keisuke Hirota, Sagamihara (JP); Jumma Kudo, Arakawa (JP)

(73) Assignee: FUJITSU LIMITED, Kawasaki (JP)

( * ) Notice: Subject to any disclaimer, the term of this patent is extended or adjusted under 35 U.S.C. 154(b) by 948 days.

(21) Appl. No.: 16/015,749

(22) Filed: Jun. 22, 2018

(65) Prior Publication Data

US 2019/0005391 A1    Jan. 3, 2019

(30) Foreign Application Priority Data

Jun. 30, 2017 (JP) .............................. JP2017-128186

(51) Int. Cl.
*G06N 5/02* (2006.01)
*G06N 20/00* (2019.01)
*G06F 16/2458* (2019.01)

(52) U.S. Cl.
CPC ............ *G06N 5/02* (2013.01); *G06F 16/2474* (2019.01); *G06N 20/00* (2019.01)

(58) Field of Classification Search
CPC ....... G06N 5/02; G06N 20/00; G06F 16/2474
See application file for complete search history.

(56) References Cited

U.S. PATENT DOCUMENTS

| 2013/0024457 | A1* | 1/2013 | Chua ...................... | G06F 16/30 707/740 |
| 2014/0297571 | A1* | 10/2014 | Beamon ................ | G06F 16/313 706/12 |
| 2018/0341871 | A1* | 11/2018 | Maitra .................. | G06N 3/0427 |
| 2019/0325347 | A1* | 10/2019 | Allen ..................... | G06N 20/00 |

FOREIGN PATENT DOCUMENTS

| JP | 2007-157006 | 6/2007 |
| JP | 2015-52811 A | 3/2015 |

OTHER PUBLICATIONS

Japanese Office Action dated Nov. 24, 2020 for corresponding Japanese Patent Application No. 2017-128186, with English Translation, 12 pages.

\* cited by examiner

*Primary Examiner* — Kevin W Figueroa
(74) *Attorney, Agent, or Firm* — Fujitsu Patent Center

(57) ABSTRACT

A non-transitory computer-readable storage medium storing a program that causes a computer to execute a process, the process including determining whether first answer information has been cited in a generation process of second answer information for a first inquiry based on history information, stored in a storage device, indicating a citation histories regarding pieces of answer information, and generating training data associating the first inquiry with the first answer information when the first answer information has been cited in a generation process.

7 Claims, 20 Drawing Sheets

FIG. 19

|  | EVENT | MONITORING | CONDITION | ... |
|---|---|---|---|---|
| EVENT | 0.5 | 0.1 | 0.3 | ... |
| MONITORING | 0.3 | 0.5 | 0.6 | ... |
| CONDITION | 0.3 | 0.2 | 0.4 | ... |
| ... | ... | ... | ... | ... |

135

NON-TRANSITORY COMPUTER-READABLE STORAGE MEDIUM, TRAINING DATA GENERATION APPARATUS, AND TRAINING DATA GENERATION METHOD

CROSS-REFERENCE TO RELATED APPLICATION

This application is based upon and claims the benefit of priority of the prior Japanese Patent Application No. 2017-128186, filed on Jun. 30, 2017, the entire contents of which are incorporated herein by reference.

FIELD

The embodiments discussed herein are related to a non-transitory computer-readable storage medium, a training data generation apparatus, and a training data generation method.

BACKGROUND

Recently, use of machine learning in various fields has been being studied. For example, there is an information processing system in which, when an inquiry is received from a user, an answer or its candidates for the inquiry are extracted from a database based on the words and the expressions included in the inquiry. Extraction, using a machine learning method, of an appropriate answer or its candidates for an inquiry in such an information processing system is being studied.

Japanese Laid-open Patent Publication No. 2007-157006 is an example of the related art.

SUMMARY

According to an aspect of the invention, a non-transitory computer-readable storage medium storing a program that causes a computer to execute a process, the process including determining whether first answer information has been cited in a generation process of second answer information for a first inquiry based on history information, stored in a storage device, indicating a citation histories regarding pieces of answer information, and generating training data associating the first inquiry with the first answer information when the first answer information has been cited in a generation process The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 19 is a diagram illustrating an exemplary learning result table; and

DESCRIPTION OF EMBODIMENTS

In an information processing system which extracts an answer to an inquiry or answer candidates, for example, an operator who receives an inquiry generates an appropriate answer based on the extracted candidates, and transmits the answer to the user. A combination of an answer and an inquiry which are generated at that time may be accumulated as training data used in machine learning. However, such a method of accumulating training data has a problem in that only one piece of training data is accumulated for one inquiry, resulting in low efficiency of accumulating training data.

In one aspect, it is an object of the embodiments to provide a training data generation program, a training data generation apparatus, and a training data generation method which enable training data to be increased efficiently.

Embodiments will be described below with reference to the drawings.

First Embodiment

Figure 1:
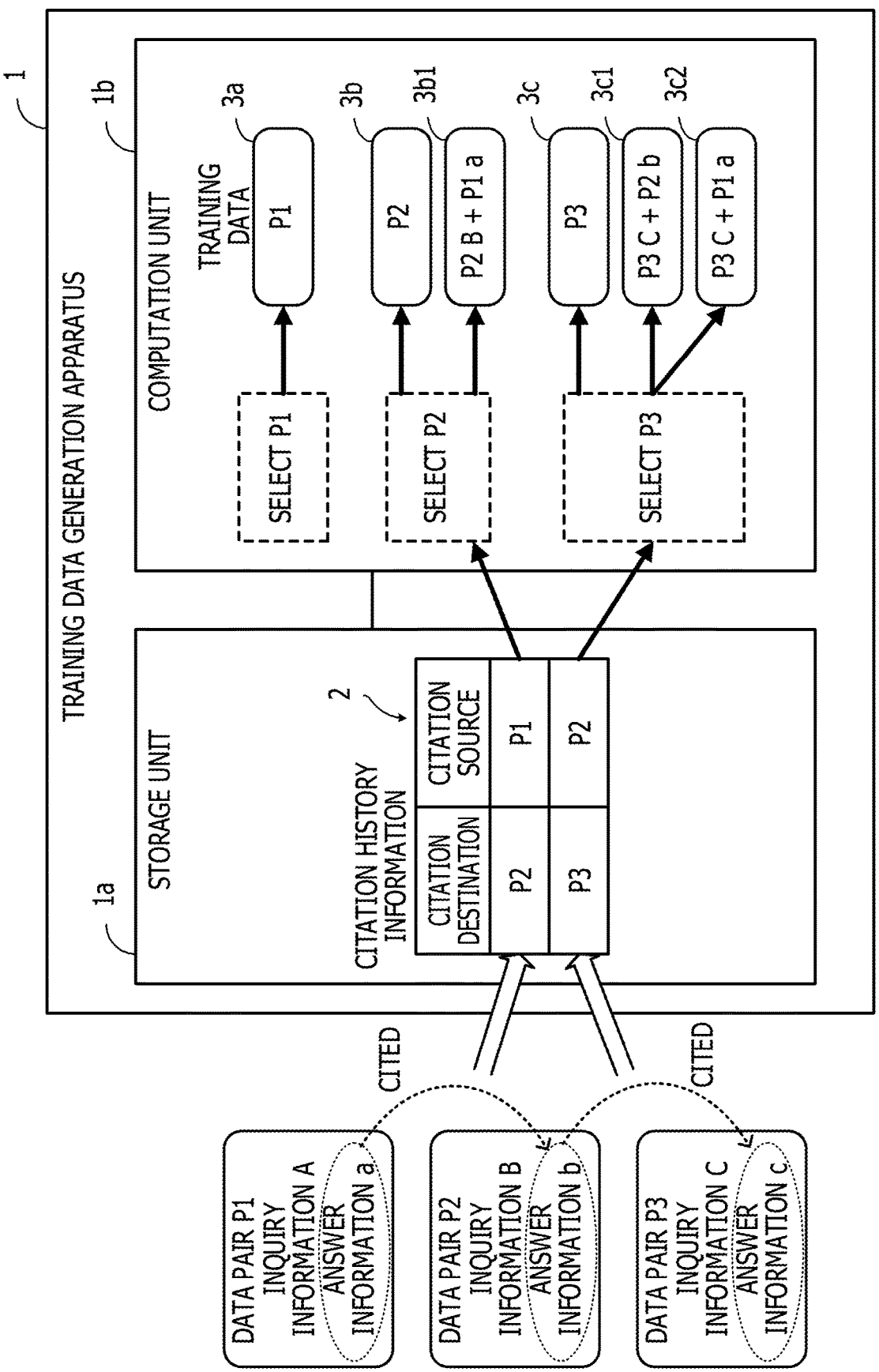
FIG. 1 is a diagram illustrating an exemplary training data generation apparatus according to a first embodiment.

FIG. 1 is a diagram illustrating an exemplary training data generation apparatus according to a first embodiment.

A training data generation apparatus 1 illustrated in FIG. 1 generates training data used in machine learning for outputting an appropriate answer to an inquiry. The generated training data includes inquiry information indicating the content of an inquiry and answer information indicating the content of the answer to the inquiry.

The training data generation apparatus 1 includes a storage unit 1a and a computation unit 1b. For example, the storage unit 1a is implemented as a storage area of a storage device (not illustrated) included in the training data generation apparatus 1, such as a random access memory (RAM) or a hard disk drive (HDD). For example, the computation unit 1b is implemented as a processor (not illustrated) included in the training data generation apparatus 1. In this case, the processes of the computation unit 1b are implemented by the processor executing given programs. Examples of the processor include a central processing unit (CPU), a digital signal processor (DSP), an application specific integrated circuit (ASIC), and a field programmable gate array (FPGA).

For example, the training data generation apparatus 1 uses information, which includes inquiry information and answer information and which is generated by an operator, so as to generate training data. For example, assume that a service is provided. In the service, an inquiry from a user of the service is received; an operator generates an answer to the inquiry; and the generated answer is output to the user. In this service, when an operator performs an operation to generate an answer which is output to the user, information including a pair of inquiry information, which indicates the content of the inquiry, and answer information, which indicates the content of the answer, is generated. The information generated at that time is hereinafter called a "data pair".

FIG. 1 illustrates an example in which data pairs P1 to P3 are generated. The data pair P1 includes inquiry information A and answer information a. The data pair P2 includes inquiry information B and answer information b. The data pair P3 includes inquiry information C and answer information c.

In generating answer information for certain inquiry information, an operator may cite answer information included in an existing data pair. At that time, information indicating which answer information has been cited in generating answer information for inquiry information is registered in citation history information 2. FIG. 1 illustrates an example in which, in the citation history information 2, the name of a data pair including citation-destination answer information, which includes a citation, and the name of a data pair including citation-source answer information, from which the citation is made, are registered.

In the example in FIG. 1, assume that, in generating the answer information b of the data pair P2, the answer information a of the data pair P1 has been cited. In this case, in the citation history information 2, "P2" indicating the data pair P2 is registered as a citation destination, and "P1" indicating the data pair P1 is registered as a citation source. After that, assume that, in generating the answer information c of the data pair P3, the answer information b of the data pair P2 has been cited. In this case, in the citation history information 2, "P3" indicating the data pair P3 is registered as a citation destination, and "P2" indicating the data pair P2 is registered as a citation source.

The storage unit 1a stores the citation history information 2 as described above. The computation unit 1b generates training data by using generated data pairs. For example, the computation unit 1b may use, as training data, a data pair itself which is generated through an operator's operation. However, such a method generates only pieces of training data whose number is the same as the number of generated data pairs, which may not be regarded as having a high generation efficiency. Therefore, while referring to the citation history information 2, the computation unit 1b further generates training data according to a procedure as described below.

The computation unit 1b refers to the citation history information 2 to determine whether or not different answer information has been cited in generating answer information for certain inquiry information. The different answer information, on which such a determination is performed, may encompass not only first different answer information which has been cited directly for the certain inquiry information, but also second different answer information which has been cited indirectly, that is, the second different answer information which has been cited in generating the first different answer information which has been cited in the answer information for certain inquiry information. When it is determined that different answer information has been cited directly or indirectly in generating the answer information for the certain inquiry information, the computation unit 1b generates training data including the inquiry information and the different answer information which has been cited directly or indirectly for the inquiry information. The generated training data is stored, for example, in the storage unit 1a.

In the example in FIG. 1, when the computation unit 1b selects the data pair P1 as a processing target, the computation unit 1b outputs the data pair P1 itself as training data 3a. In addition, the computation unit 1b refers to the citation history information 2, and determines whether or not different answer information has been cited in generating the answer information a of the data pair P1. In the example in FIG. 1, in generating the answer information a, different answer information has not been cited. Therefore, only the training data 3a is generated.

Then, when the computation unit 1b selects the data pair P2 as a processing target, the computation unit 1b outputs the data pair P2 itself as training data 3b. In addition, the computation unit 1b refers to the citation history information 2, and determines whether or not different answer information has been cited in generating the answer information b of the data pair P2. In the example in FIG. 1, the answer information a of the data pair P1 has been cited in generating the answer information b. In this case, the computation unit 1b generates training data 3b1 including the inquiry information B of the data pair P2 and the answer information a of the data pair P1.

When the computation unit 1b selects the data pair P3 as a processing target, the computation unit 1b outputs the data pair P3 itself as training data 3c. In addition, the computation unit 1b refers to the citation history information 2, and determines whether or not different answer information has been cited in generating the answer information c of the data pair P3. In the example in FIG. 1, the answer information b of the data pair P2 has been cited directly in generating the answer information c. In this case, the computation unit 1b generates training data 3c1 including the inquiry information C of the data pair P3 and the answer information b of the data pair P2.

The citation history information 2 describes that the answer information b of the data pair P2 has been generated by citing the answer information a of the data pair P1. In this case, the answer information a of the data pair P1 has been cited indirectly in generating the answer information c. Therefore, the computation unit 1b may generate training data 3c2 including the inquiry information C of the data pair P3 and the answer information a of the data pair P1, which has been cited indirectly.

As described above, in addition to the training data 3a to 3c in which the generated data pairs P1 to P3 are used as they are, the training data generation apparatus 1 may further generate the training data 3b1, 3c1, and 3c2 based on the citation relationships of the answer information. This may increase the training data efficiently. An increase in the number of pieces of generated training data may improve the accuracy of machine learning for outputting an appropriate answer to an inquiry.

Second Embodiment

Figure 2:
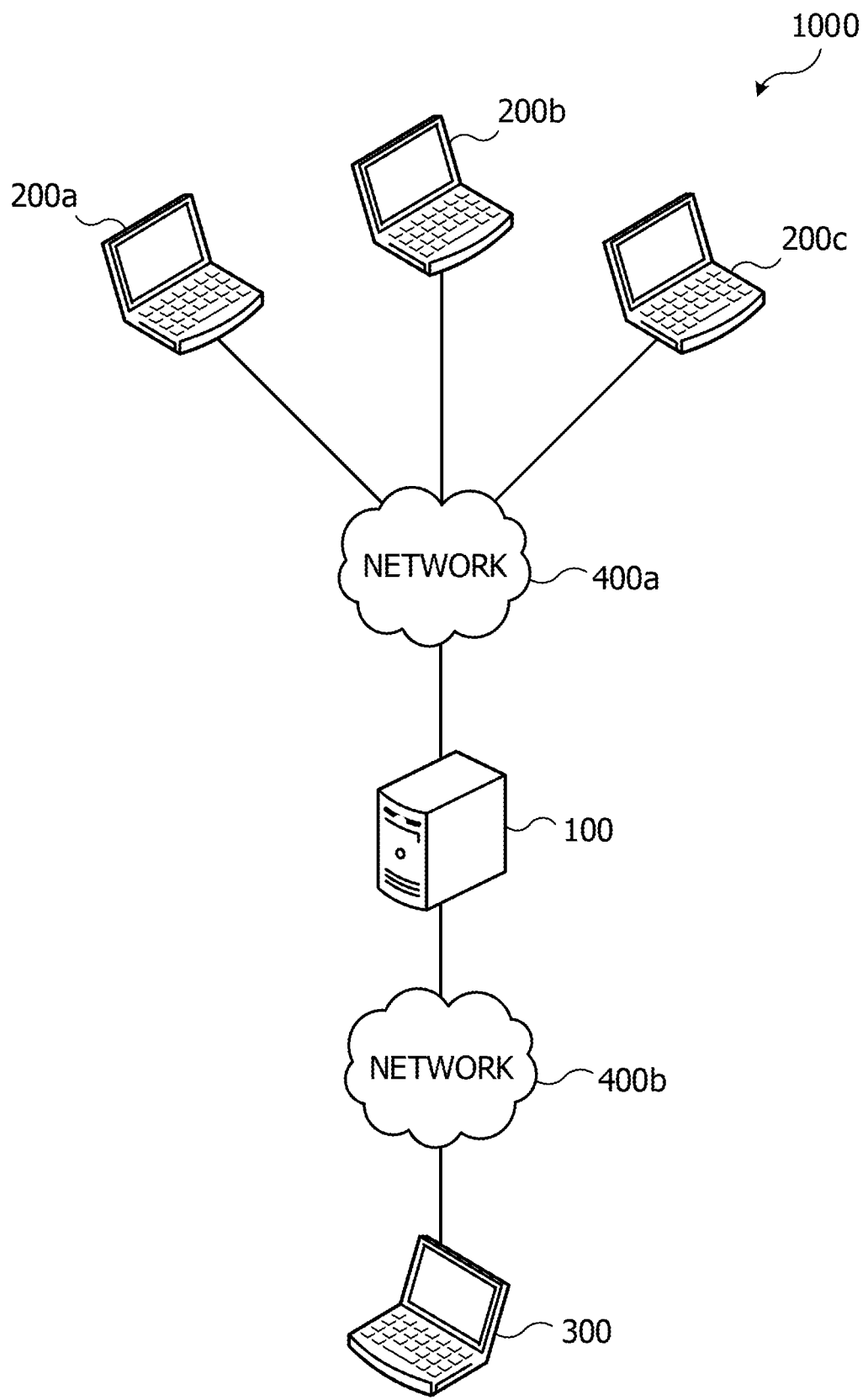
FIG. 2 is a diagram illustrating an exemplary information processing system according to a second embodiment.

FIG. 2 is a diagram illustrating an exemplary information processing system according to a second embodiment.

An information processing system 1000 illustrated in FIG. 2 performs processes about a service for receiving an inquiry and providing an answer to the inquiry. More specifically, an inquiry from a user of the service is received, and candidates of answer information, which indicates the content of an answer, for inquiry information indicating the content of the inquiry are extracted. In addition, answer information generated by an operator based on the extracted candidates is transmitted to the user.

The information processing system 1000 includes a server 100, terminal apparatuses 200a, 200b, and 200c, and a terminal apparatus 300. The server 100 is connected to the terminal apparatuses 200a, 200b, and 200c over a network 400a. The server 100 is connected to the terminal apparatus 300 over a network 400b. Examples of the networks 400a and 400b include a local area network (LAN), a wide area network (WAN), and the Internet. The server 100 is a computer which receives an inquiry from a user and which transmits, to the user, answer information for the inquiry. The terminal apparatuses 200a, 200b, and 200c are used by users. The terminal apparatus 300 is used by an operator generating answer information.

A user of the service uses any of the terminal apparatuses 200a, 200b, and 200c to transmit an inquiry in any question format. The terminal apparatus 200a, 200b, or 200c transmits, to the server 100, inquiry information indicating the content of the inquiry. In accordance with operations performed by an operator on the terminal apparatus 300, the server 100 generates answer information for the received inquiry information. The server 100 transmits the generated answer information to the user-side terminal apparatus, for example, by using electronic mail.

The server 100 has a function of providing frequently asked questions (FAQs) to users. For example, before transmitting an inquiry, a user uses any of the terminal apparatuses 200a, 200b, and 200c to request searching for FAQs by specifying a search keyword. The server 100 transmits FAQ information including the search keyword, to the terminal apparatus of the user. When the user does not obtain a desired answer from the FAQ search, the user may transmit inquiry information to the server 100 so as to perform inquiry.

Further, the server 100 has a function of assisting an operator in generating answer information. Specifically, the server 100 has a database accumulating answer information, which has been transmitted, and available FAQs. On receiving inquiry information, the server 100 searches the database to extract answer information candidates for the inquiry information, and presents the candidates to the operator through the terminal apparatus 300. The operator may use the terminal apparatus 300 to generate answer information for the received inquiry information while referring to the contents of the presented answer information candidates. The operator may also generate answer information by citing the presented answer information.

The server 100 generates training data based on information, which includes a pair of inquiry information and answer information and which has been transmitted to the user, and generated FAQ information. The server 100 uses the generated training data to perform machine learning for extracting appropriate answer information candidates for the inquiry information.

The hardware configuration of the server 100 will be described.

Figure 3:
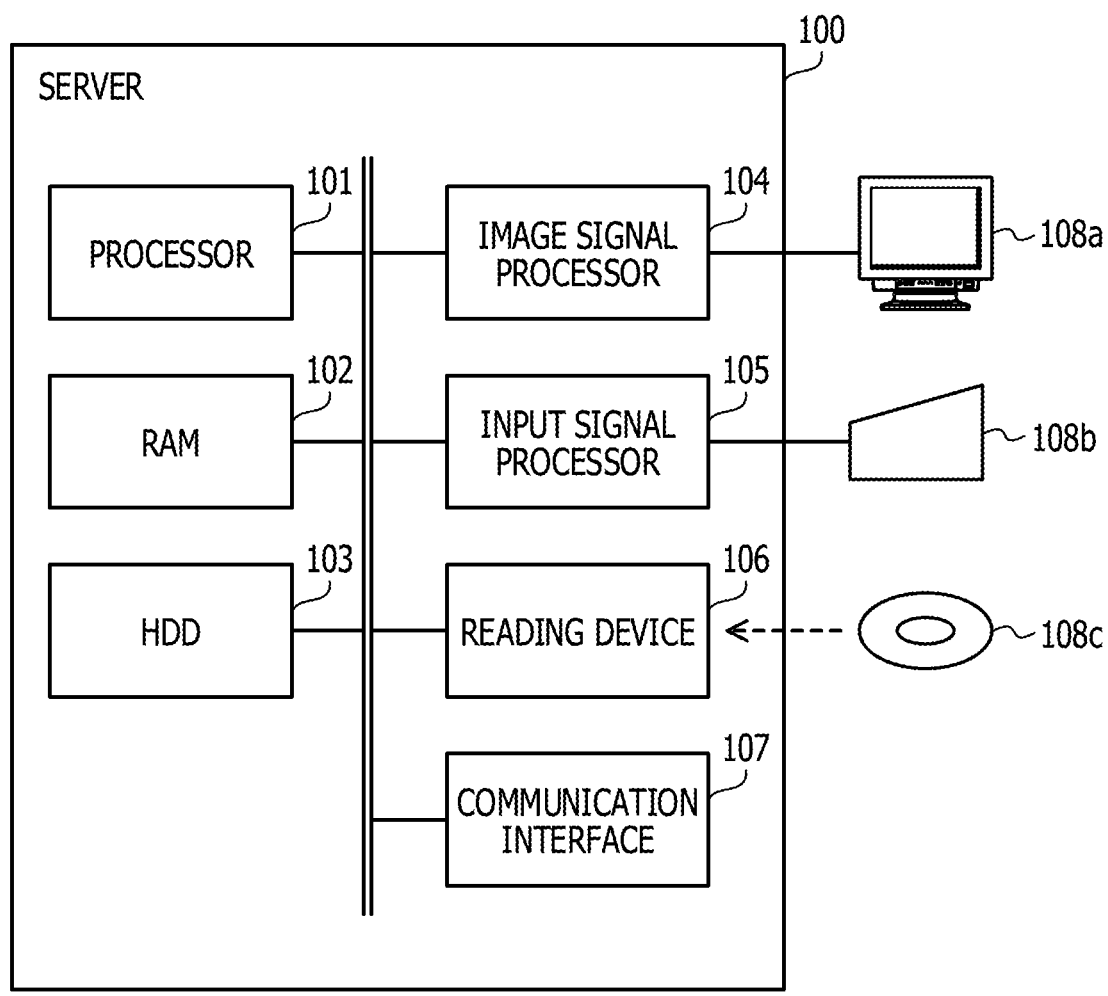
FIG. 3 is a diagram illustrating an exemplary hardware configuration of a server according to the second embodiment.

FIG. 3 is a diagram illustrating an exemplary hardware configuration of the server according to the second embodiment.

The server 100 includes a processor 101, a random-access memory (RAM) 102, an HDD 103, an image signal processor 104, an input signal processor 105, a reading device 106, and a communication interface 107.

The processor 101 may be a multiprocessor. The processor 101 is, for example, a central processing unit (CPU), a digital signal processor (DSP), an application-specific integrated circuit (ASIC), or a field programmable gate array (FPGA). The processor 101 may be a combination of two or more types of a CPU, a DSP, an ASIC, a FPGA, and the like.

The RAM 102 is a main storage device of the server 100. The RAM 102 is used to temporarily store at least some of the programs of an operating system (OS) and application programs which are executed by the processor 101. The RAM 102 stores various data used in the processes performed by the processor 101.

The HDD 103 is an auxiliary storage device of the server 100. The HDD 103 writes and reads data magnetically on an internal magnetic disk. The HDD 103 stores OS programs, application programs, and various data. The server 100 may include another type of auxiliary storage device such as a solid state drive (SSD), or may include multiple auxiliary storage devices.

The image signal processor 104 outputs images to a display 108a connected to the server 100, in accordance with instructions from the processor 101. As the display 108a, a cathode ray tube (CRT) display, a liquid-crystal display, or the like may be used.

The input signal processor 105 obtains an input signal from an input device 108b connected to the server 100, and outputs the input signal to the processor 101. As the input device 108b, for example, a pointing device, such as a mouse or a touch panel, and a keyboard may be used.

The reading device 106 reads programs and data recorded in a recording medium 108c. As the recording medium 108c, for example, a magnetic disk, such as a flexible disk (FD) or an HDD, an optical disk, such as a compact disc (CD) or a digital versatile disc (DVD), or a magneto-optical (MO) disk may be used. As the recording medium 108c, for example, a nonvolatile semiconductor memory such as a flash memory card may be used. For example, the reading device 106 stores programs and data, which are read from the recording medium 108c, in the RAM 102 or the HDD 103 in accordance with instructions from the processor 101.

The communication interface 107 performs communication with the terminal apparatuses 200a, 200b, and 200c over the network 400a. The communication interface 107 performs communication with the terminal apparatus 300 over the network 400b.

The terminal apparatuses 200a, 200b, and 200c and the terminal apparatus 300 may be implemented by using similar hardware to the server 100.

Functions provided for the server 100 will be described.

Figure 4:
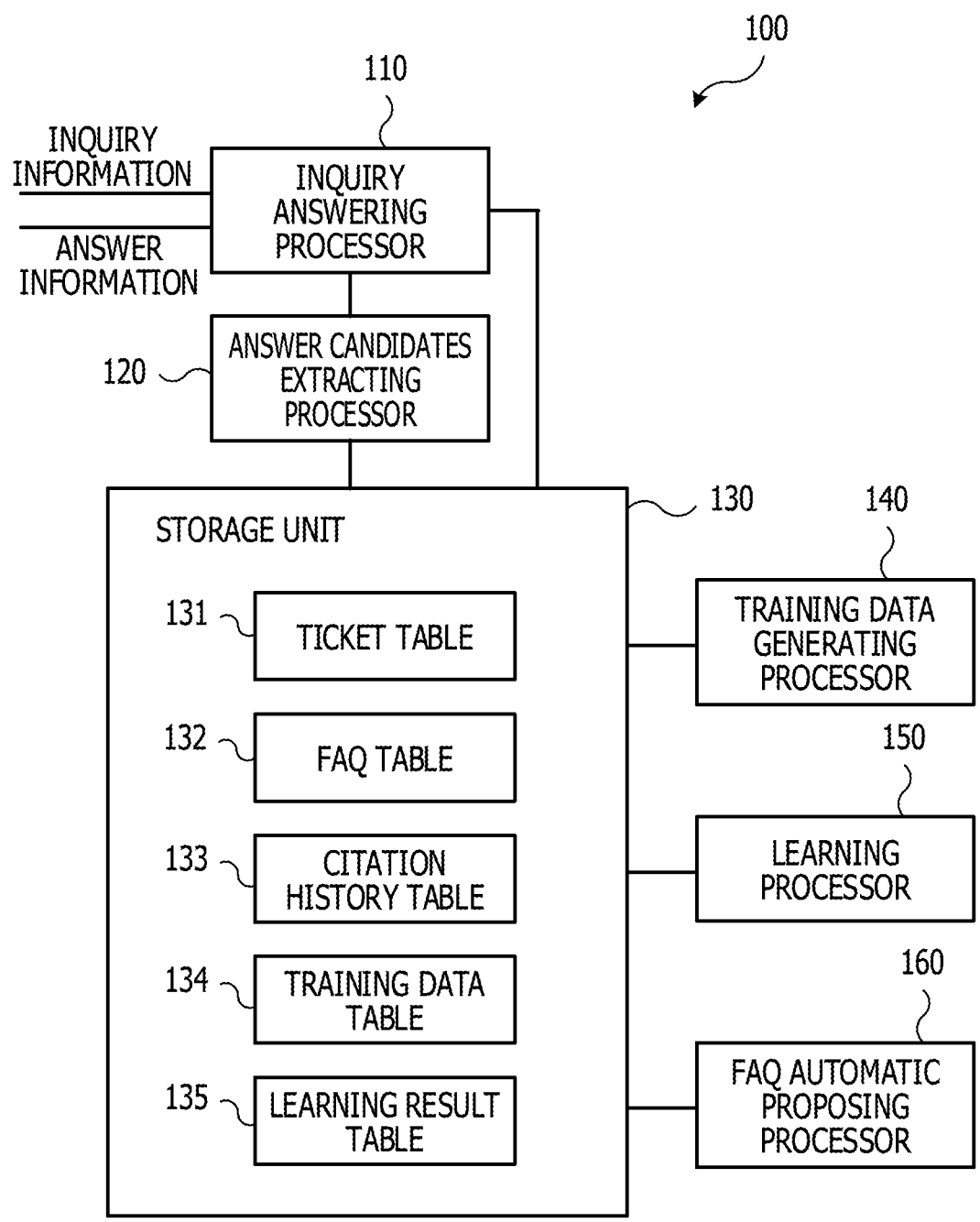
FIG. 4 is a diagram illustrating exemplary functions included in a server according to the second embodiment.

FIG. 4 is a diagram illustrating exemplary functions provided for the server according to the second embodiment.

The server 100 includes an inquiry answering processor 110, an answer candidates extracting processor 120, a storage unit 130, a training data generating processor 140, a learning processor 150, and a FAQ automatic proposing processor 160.

The storage unit 130 is implemented as a storage area allocated in the RAM 102 or the HDD 103. The storage unit 130 stores a ticket table 131, a FAQ table 132, a citation history table 133, a training data table 134, and a learning result table 135.

In the ticket table 131, generated tickets are registered. A ticket indicates a data structure including inquiry information from a user and answer information for the inquiry information. A new ticket is generated when the inquiry answering processor 110 receives inquiry information from a user, and the inquiry information is set in the ticket. After that, when answer information is generated through operator's operations, the generated answer information is transmitted to the user, and the answer information is set in the ticket. The inquiry answering processor 110 registers, in the ticket table 131, the ticket in which the inquiry information and the answer information are set.

In the FAQ table 132, generated FAQs are registered. A FAQ has a similar data structure to a ticket, and includes inquiry information and answer information. A FAQ is generated in accordance with operator's operations, and is registered in the FAQ table 132. As described below, an operator may cite the content of a generated ticket so as to generate a FAQ.

Figure 5A:
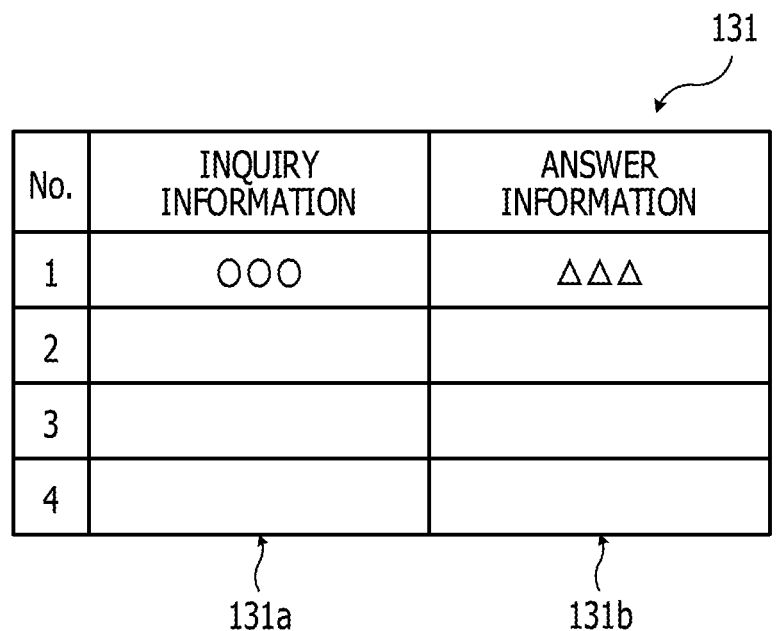
FIGS. 5A and 5B are diagrams illustrating exemplary tables included in a storage unit of a server according to the second embodiment.
Figure 5B:
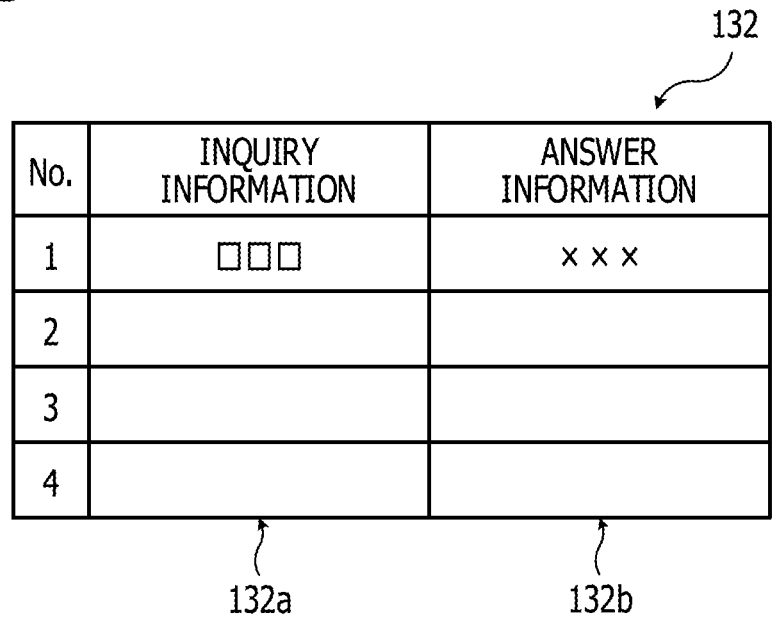

FIGS. 5A and 5B are diagrams illustrating exemplary tables included in the storage unit of the server according to the second embodiment. FIG. 5A is a diagram illustrating a ticket table, and FIG. 5B is a diagram illustrating a FAQ table.

As illustrated in FIG. 5A, the ticket table 131 includes an inquiry information field 131a, in which inquiry information is registered, and an answer information field 131b, in which answer information for the inquiry information is registered. Similarly, as illustrated in FIG. 5B, the FAQ table 132 includes an inquiry information field 132a, in which inquiry information is registered, and an answer information field 132b, in which answer information for the inquiry information is registered.

Both the tickets registered in the ticket table 131 and the FAQs registered in the FAQ table 132 are used also as training data. In the second embodiment, training data is generated asynchronously with respect to timings of generation/registration of tickets and FAQs. In generating training data, tickets that have been newly registered in the ticket table 131 and FAQs that have been newly registered in the FAQ table 132 are chosen as new training data.

A description will be made below with reference to FIG. 4.

In the citation history table 133, information indicating a correspondence (citation relationship) between a ticket and a different ticket or a FAQ which has been cited in generating the answer information of the ticket is registered. In the citation history table 133, information indicating a correspondence (citation relationship) between a FAQ and a ticket that has been cited in generating the FAQ is also registered.

In the training data table 134, training data, which is generated based on citation relationships between tickets and between a ticket and a FAQ, is registered. The training data also has a similar data structure to a ticket, and includes inquiry information and answer information.

In the learning result table 135, information indicating learning results obtained through machine learning is registered. For example, in the learning result table 135, conversion parameters for converting keywords extracted from the inquiry information included in the training data, into keywords extracted from the answer information included in the training data are registered.

The processes performed by the inquiry answering processor 110, the answer candidates extracting processor 120, the training data generating processor 140, the learning processor 150, and the FAQ automatic proposing processor 160 are implemented, for example, by the processor 101 executing given application programs.

The inquiry answering processor 110 receives inquiry information indicating the content of an inquiry from a user of the service, and transmits, to the user, answer information for the received inquiry information.

The answer candidates extracting processor 120 extracts candidates of answer information (and its inquiry information, that is, a ticket or a FAQ) for the inquiry information received by the inquiry answering processor 110, from the ticket table 131 and the FAQ table 132 based on the learning result table 135.

The inquiry answering processor 110 presents the extracted answer information candidates to an operator through the terminal apparatus 300. While referring to the presented answer information, the operator may generate answer information. The inquiry answering processor 110 transmits the generated answer information to the user. The inquiry answering processor 110 registers, in the ticket table 131, the generated ticket including the inquiry information and the answer information generated for the inquiry information. Further, the inquiry answering processor 110 registers, in the citation history table 133, information indicating whether or not the answer information of a different ticket or a FAQ in the candidates has been cited in generating the answer information of the ticket. In the case where a different ticket or a FAQ has been cited, the inquiry answering processor 110 registers, in the citation history table 133, information indicating the citation relationship between the ticket and the different ticket or the FAQ.

The inquiry answering processor 110 receives a FAQ search request from a user, and presents the FAQ search result to the user. Further, the inquiry answering processor 110 generates a FAQ in accordance with operator's operations, and registers the generated FAQ in the FAQ table 132.

The training data generating processor 140 generates training data by using tickets that have been newly registered in the ticket table 131. At that time, the training data generating processor 140 refers to the citation history table 133, and determines whether or not the answer information of a certain ticket includes a direct citation from the answer information of a second ticket or FAQ. When the answer information of the certain ticket includes a direct citation from the answer information of a second ticket or FAQ, the training data generating processor 140 generates training data including the inquiry information of the certain ticket and the answer information of the second ticket or FAQ. The training data generating processor 140 registers, in the training data table 134, the training data thus generated.

The training data generating processor 140 also refers to the citation history table 133, and determines whether or not the answer information of a third ticket or FAQ has been cited in generating the second ticket or FAQ including the answer information having been cited as the answer information of the certain ticket. When a third ticket or FAQ has been cited, that is, the answer information of the certain ticket is generated by indirectly citing the answer information of the third ticket or FAQ, the training data generating processor 140 generates training data based on the citation relationship. Specifically, the training data generating processor 140 generates training data including the inquiry information of the certain ticket and the answer information of the third ticket or FAQ which has been cited in the answer information of the second ticket or FAQ which has been cited as the answer information of the certain ticket. The training data generating processor 140 also registers, in the training data table 134, the training data thus generated.

The training data generating processor 140 generates training data by using the FAQs that have been newly registered in the FAQ table 132. At that time, the training data generating processor 140 refers to the citation history table 133, and determines whether or not a certain FAQ includes a direct citation from the content of a ticket. When the content of the certain FAQ includes a direct citation from the content of a ticket, the training data generating processor 140 generates training data including the inquiry information of the cited ticket and the answer information of the FAQ which is a citation destination. The training data generating processor 140 registers, in the training data table 134, the training data thus generated.

The training data generating processor 140 further refers to the citation history table 133, and determines whether or not the ticket having been cited in generating the certain FAQ includes a citation from a different ticket or FAQ in generating the ticket. When the ticket includes a citation from a different ticket or FAQ, the training data generating processor 140 generates training data based on the citation relationship. Specifically, the training data generating processor 140 generates training data including the answer information of the certain FAQ and the inquiry information of the different ticket or FAQ having been cited as the answer information of the ticket having been cited in generating the certain FAQ. The training data generating processor 140 registers, in the training data table 134, the training data thus generated.

The learning processor 150 obtains training data from the ticket table 131, the FAQ table 132, and the training data table 134, and performs learning (relearning). The learning processor 150 registers the learning results in the learning result table 135. For example, the learning processor 150 performs machine learning to obtain conversion parameters for conversion into keywords extracted from the answer information included in training data, and registers the conversion parameter in the learning result table 135.

The FAQ automatic proposing processor 160 determines a ticket suitable for being cited for generating a FAQ, based on the information registered in the training data table 134, and proposes, to an operator, generating a FAQ from the determined ticket. Specifically, the FAQ automatic proposing processor 160 regards a ticket, which has been cited a certain number of times or more in generating tickets, as a ticket suitable for being cited for generating a FAQ.

Generating Training Data in Accordance with Generation of Tickets

Figure 6:
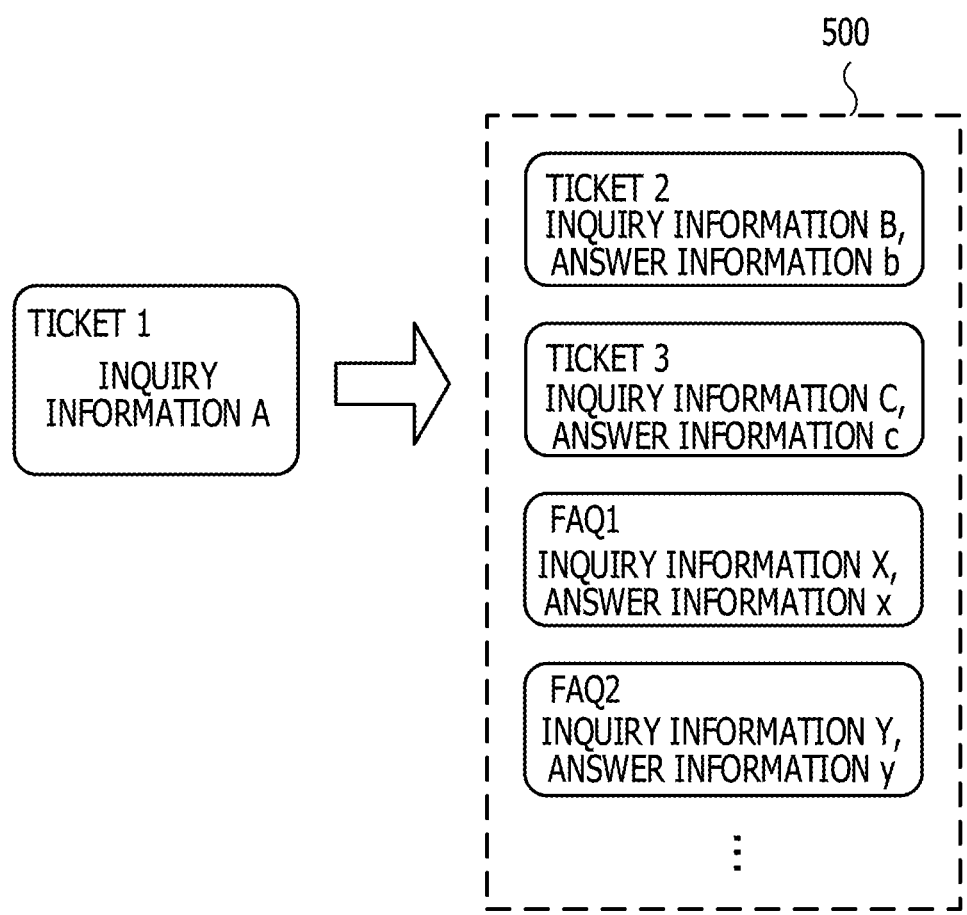
FIG. 6 is a diagram for describing the case in which an inquiry is received by a server according to the second embodiment.

FIG. 6 is a diagram for describing the case in which an inquiry is received by the server according to the second embodiment.

For example, as illustrated in FIG. 6, the inquiry answering processor 110 obtains a new ticket 1 including inquiry information A. For example, when the inquiry answering processor 110 receives an inquiry from the user-side terminal apparatus 200a, 200b, or 200c, the inquiry answering processor 110 generates the new ticket 1 including inquiry information indicating the content of the received inquiry.

The answer candidates extracting processor 120 extracts answer information candidates (answer candidates) 500 for the inquiry information A included in the obtained new ticket 1. The answer candidates 500 are extracted from the ticket table 131 and the FAQ table 132 based on the learning result table 135. For example, as illustrated in FIG. 6, a FAQ 1 including inquiry information X and its answer information x, a FAQ 2 including inquiry information Y and its answer information y, a ticket 2 including inquiry information B and its answer information b, a ticket 3 including inquiry information C and its answer information c, and the like are extracted as the answer candidates 500.

While referring to the contents of the answer candidates 500 extracted by the answer candidates extracting processor 120, an operator who uses the terminal apparatus 300 generates answer information for the inquiry information A. The inquiry answering processor 110 transmits the generated answer information to the user.

Figure 7:
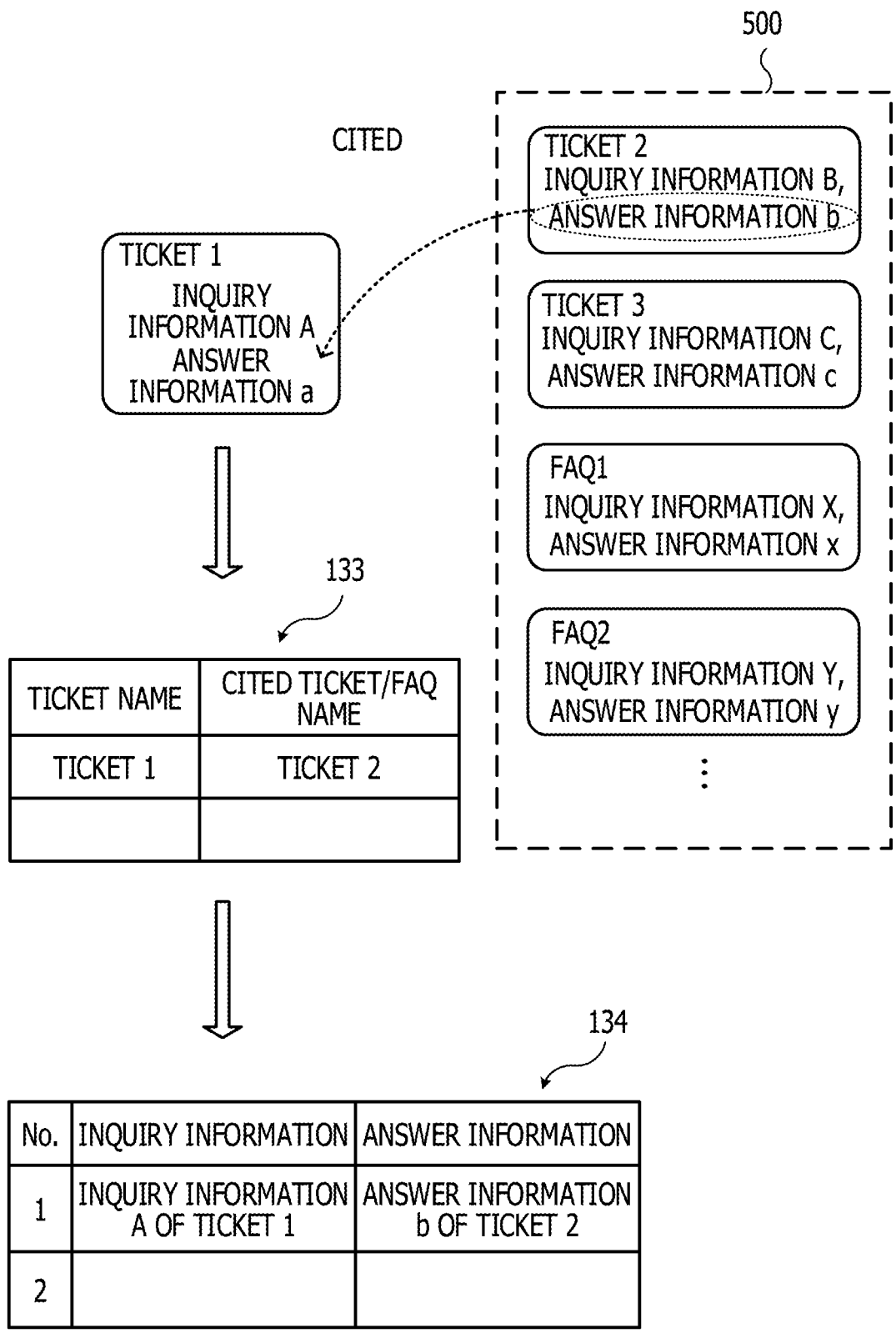
FIG. 7 is a diagram for describing a first example in which an answer for a new ticket is made in a server according to the second embodiment.

FIG. 7 is a diagram for describing a first example in which an answer for a new ticket is made in the server according to the second embodiment.

For example, as illustrated in FIG. 7, assume that, in generating the answer information a for the inquiry information A of the new ticket 1, an operator cites the answer information b of the ticket 2 from the answer candidates 500. In this case, the operator uses the sentences of the cited answer information b as they are or edits the sentences so as to generate the answer information a of the ticket 1.

The inquiry answering processor 110 transmits (issues), to the user, the inquiry information A and the answer information a of the ticket 1 thus generated. The inquiry answering processor 110 registers, in the ticket table 131, the inquiry information A and its answer information a of the issued ticket 1.

The inquiry answering processor 110 registers, in the citation history table 133, the citation relationship between the issued ticket 1 and the ticket 2 having been cited in generating the ticket 1. As illustrated in FIG. 7, the citation history table 133 includes the ticket name field and the cited ticket/FAQ name field. When the answer information a of the ticket 1 is generated by citing the answer information b of the ticket 2, the identification number of the ticket 1 is registered in the ticket name field, and the identification number of the ticket 2 is registered in the cited ticket/FAQ field.

At a timing of generating training data after that, the training data generating processor 140 chooses the issued ticket 1 as training data. At that time, the training data generating processor 140 refers to the citation history table 133, and determines whether or not a different ticket or a FAQ has been cited in generating the answer information a of the ticket 1. In the example in FIG. 7, the ticket 2 has been cited in generating the answer information a of the ticket 1. Therefore, the training data generating processor 140 determines that the ticket 1 includes a citation from the ticket 2, and generates training data including the inquiry information A of the ticket 1 and the answer information b of the ticket 2. The training data generating processor 140 registers the generated training data in the training data table 134 (No. 1).

For example, the server 100 performs such operations so as to accumulate, in the training data table 134, training data including received inquiry information and different answer information having been cited in generating the answer information for the inquiry information.

Figure 8:
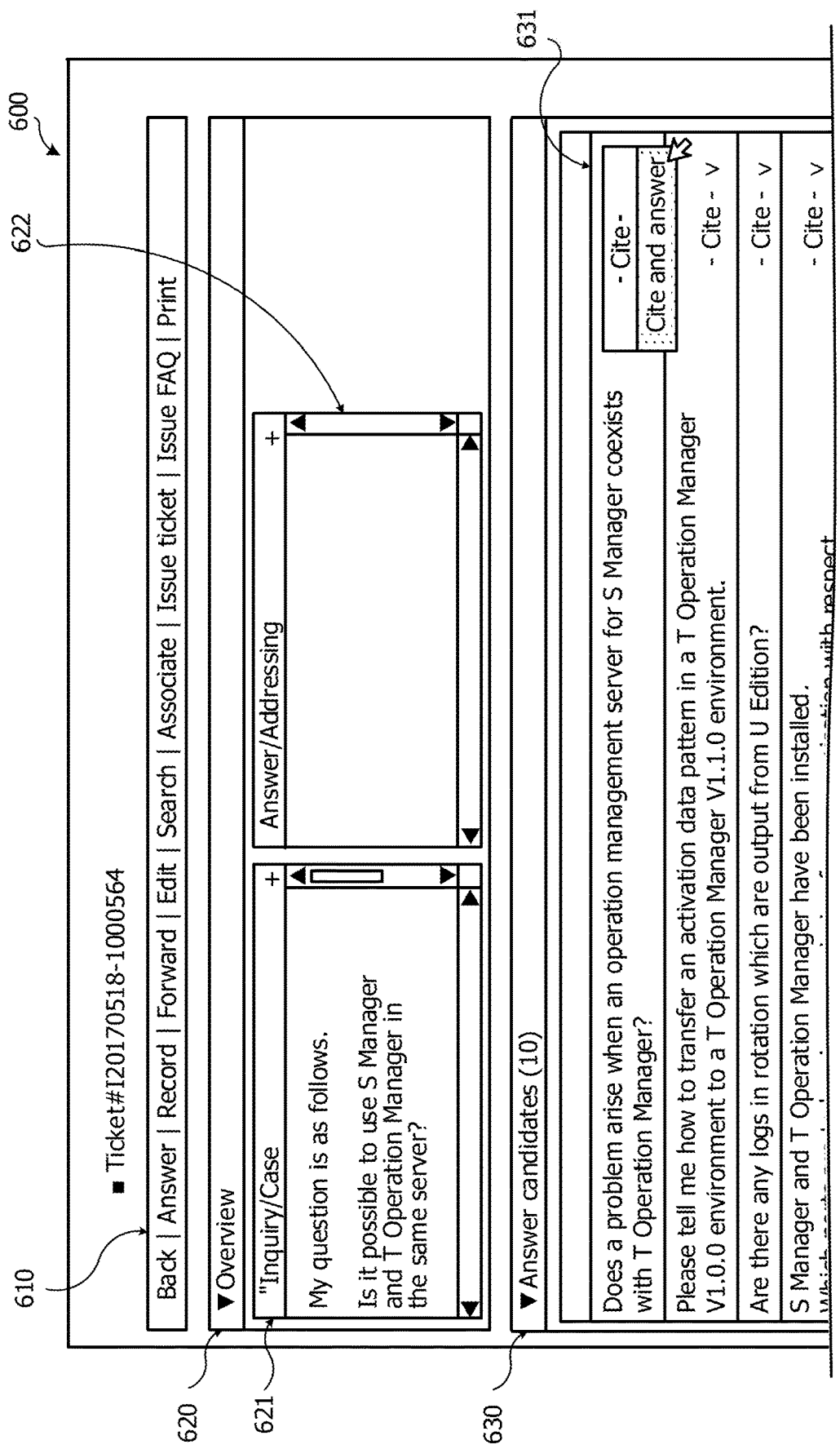
FIG. 8 is a diagram illustrating an exemplary screen displayed on an operator-side terminal apparatus connected to a server according to the second embodiment.

FIG. 8 is diagram illustrating an exemplary screen displayed on an operator-side terminal apparatus connected to the server according to the second embodiment.

On the operator-side terminal apparatus 300, a screen 600, as illustrated in FIG. 8, describing a ticket obtained by the inquiry answering processor 110 of the server 100 is displayed. The screen 600 includes a tool bar 610 indicating operation menus that are to be executed, an "Overview" field 620 for the ticket, and an "Answer candidates" field 630. The tool bar 610 includes, as exemplary operations, menus, such as "Back", "Answer", "Record", "Forward", "Edit", "Search", "Associate", "Issue ticket", "Issue FAQ", and "Print". The "Overview" field 620 includes an "Inquiry/Case" field 621, in which the content of the inquiry information is displayed, and an "Answer/Addressing" field 622 in which the content of answer information for the inquiry information is input. In the "Answer candidates" field 630, candidates of the answer information (a ticket or a FAQ including the answer information) for the inquiry information are listed. For each candidate, whether or not "Cite and answer" is to be performed on the candidate may be selected.

When the inquiry answering processor 110 obtains a new ticket including inquiry information, the content of the inquiry information is displayed in the "Inquiry/Case" field 621. Further, answer information candidates extracted based on the inquiry information by the answer candidates extracting processor 120 are displayed in the "Answer candidates" field 630. For example, when an operator clicks one of the answer information candidates displayed in the "Answer candidates" field 630, the content of the inquiry information and the answer information included in the corresponding ticket or FAQ is displayed, for example, in a pop-up screen.

For example, the operator may input characters in the "Answer/Addressing" field 622 so as to generate answer information. In the example in FIG. 8, assume that, for the inquiry information displayed in the "Inquiry/Case" field 621, the operator cites one of the ticket/FAQ candidates listed in the "Answer candidates" field 630 so as to make an answer. In this case, the operator selects a "Cite" display region 631 which is set for each candidate, and selects "Cite and answer" for the selected candidate. When the operator selects "Cite and answer", the content of the answer information included in the ticket or FAQ of the candidate is displayed in the "Answer/Addressing" field 622. The operator may edit the content in the "Answer/Addressing" field 622 appropriately. When the operator selects "Answer" in the tool bar 610, the answer information displayed in the "Answer/Addressing" field 622 is transmitted to the use-side terminal apparatus 200a or the like through which the inquiry corresponding to the inquiry information displayed in the "Inquiry/Case" field 621 has been transmitted.

Thus, when the answer information of a ticket/FAQ candidate listed in the "Answer candidates" field 630 has been cited for the inquiry information in the "Inquiry/Case" field 621 so as to make an answer, the server 100 registers, in the ticket table 131, a ticket including the inquiry information and the answer information generated based on the cited answer information. Further, the citation relationship between the ticket and the different ticket or the FAQ having been cited as the answer information is registered in the citation history table 133.

After that, at a timing of generating training data, as described above, the training data generating processor 140 generates training data, and the generated training data is registered in the training data table 134. A timing of generating training data may be, for example, a timing at which a certain number of pieces of ticket information have been registered in the ticket table 131.

Figure 9:
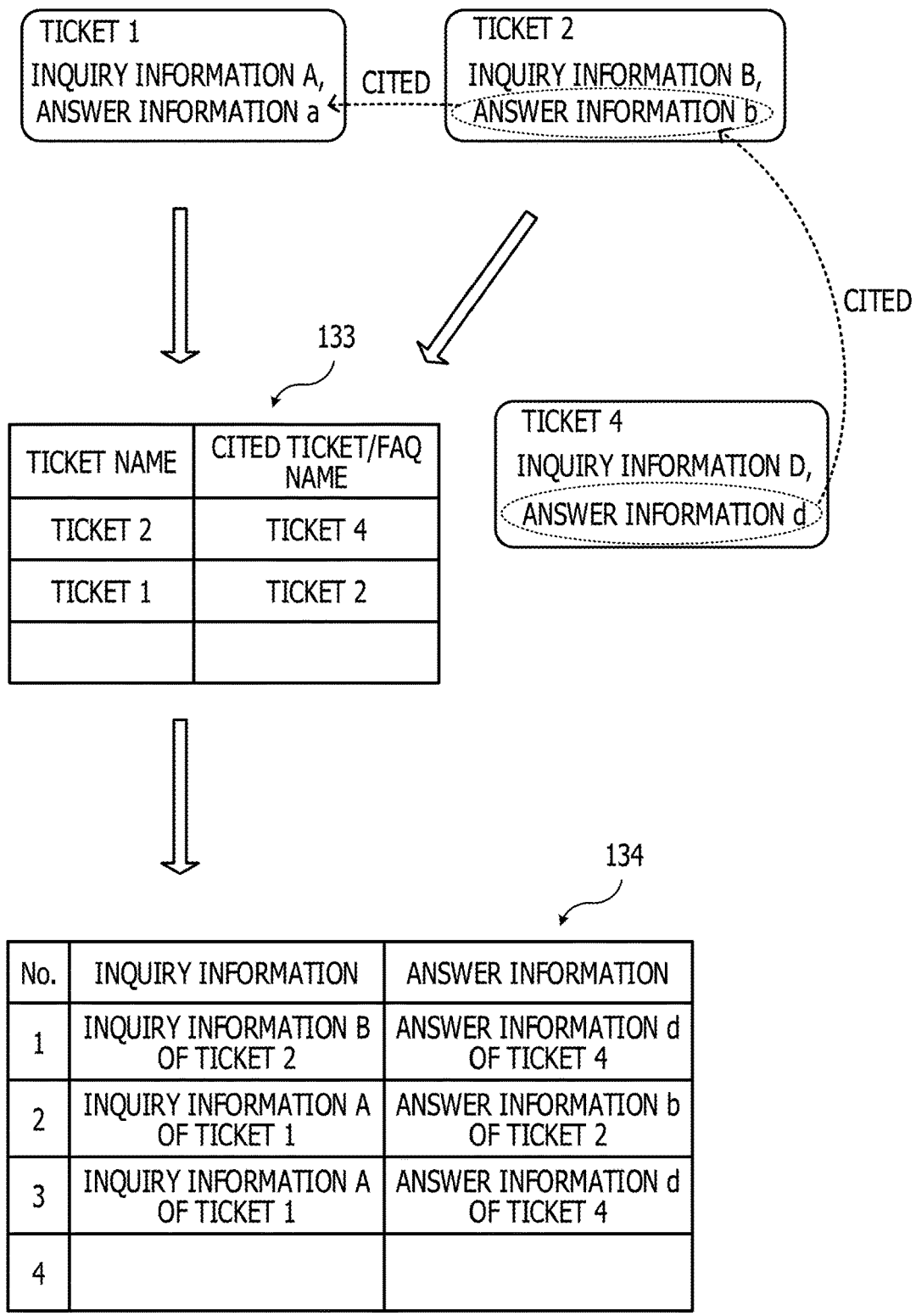
FIG. 9 is a diagram for describing a second example in which an answer for a new ticket is made in a server according to the second embodiment.

FIG. 9 is a diagram for describing a second example in which an answer for a new ticket is made in the server according to the second embodiment.

For example, as illustrated in FIG. 9, assume that an operator cites answer information d of a ticket 4 in generating the answer information b for the inquiry information B of the ticket 2, and that, after that, an operator cites the answer information b of the ticket 2 in generating the answer information a for the inquiry information A of the ticket 1.

In this case, the inquiry answering processor 110 transmits (issues) the answer information b for the inquiry information B of the ticket 2 to the user. At that time, the inquiry answering processor 110 registers, in the ticket table 131, the inquiry information B and its answer information b of the issued ticket 2, and registers, in the citation history table 133, the citation relationship between the issued ticket 2 and the ticket 4 having been cited in generating the ticket 2.

After that, the inquiry answering processor 110 transmits (issues) the answer information a for the inquiry information A of the ticket 1 to the user. At that time, the inquiry answering processor 110 registers, in the ticket table 131, the inquiry information A and its answer information a of the issued ticket 1, and registers, in the citation history table 133, the citation relationship between the issued ticket 1 and the ticket 2 having been cited in generating the ticket 1.

At a timing of generating training data after that, the training data generating processor 140 chooses, as training data, a ticket that has been newly registered. At that time, the training data generating processor 140 refers to the citation history table 133, and determines whether or not a different ticket or a FAQ has been cited in generating the new ticket.

In the example in FIG. 9, the ticket 4 has been cited in generating the answer information b of the ticket 2, and the ticket 2 has been cited in generating the ticket 1.

In this case, the training data generating processor 140 chooses the ticket 2 as training data, and determines that the ticket 2 includes a citation from the ticket 4. The training data generating processor 140 generates training data including the inquiry information B of the ticket 2 and the answer information d of the ticket 4. As illustrated in FIG. 9, the training data generating processor 140 registers the generated training data in the training data table 134 (No. 1).

The training data generating processor 140 chooses the ticket 1 as training data, and determines that the ticket 1 includes a citation from the ticket 2. The training data generating processor 140 generates training data including the inquiry information A of the ticket 1 and the answer information b of the ticket 2. As illustrated in FIG. 9, the training data generating processor 140 registers the generated training data in the training data table 134 (No. 2).

The training data generating processor 140 determines whether or not a ticket registered in the cited ticket/FAQ name field of the citation history table 133 is registered in the ticket name field of an earlier registered record. That is, the training data generating processor 140 determines whether or not a citation relationship with a different ticket or a FAQ is present. In this example, as illustrated in the citation history table 133 in FIG. 9, the ticket 1 includes a citation from the ticket 2, and the ticket 2 includes a citation from the ticket 4. Therefore, the ticket 2 registered in the cited ticket/FAQ name field is registered in the ticket name field of a different record. It is determined that a citation relationship with the different ticket 4 registered in the cited ticket/FAQ name field of the record is present. That is, the ticket 1 and the ticket 4 have a relationship in which the answer information d of the ticket 4 has been cited indirectly in generating the answer information a for the inquiry information A of the ticket 1. For the ticket 1 and the ticket 4 having such an indirect citation relationship, the training data generating processor 140 generates training data including the inquiry information A of the ticket 1 and the answer information d of the ticket 4. As illustrated in FIG. 9, the training data generating processor 140 registers the generated training data in the training data table 134 (No. 3).

As described above, the training data accumulated in the server 100 is not limited to a one-to-one relationship between the inquiry information A of the ticket 1 and the answer information a for the inquiry information A. The server 100 further accumulates training data, which includes the inquiry information A and the answer information b having a direct citation relationship with the inquiry information A, and training data, which includes the inquiry information A and the answer information d having an indirect citation relationship with the inquiry information A. Thus, training data may be accumulated efficiently. This efficient accumulation of training data achieves efficient improvement in the learning accuracy of a learning process using the training data and in the accuracy of extracting answer information candidates for inquiry information from a user.

Figure 10:
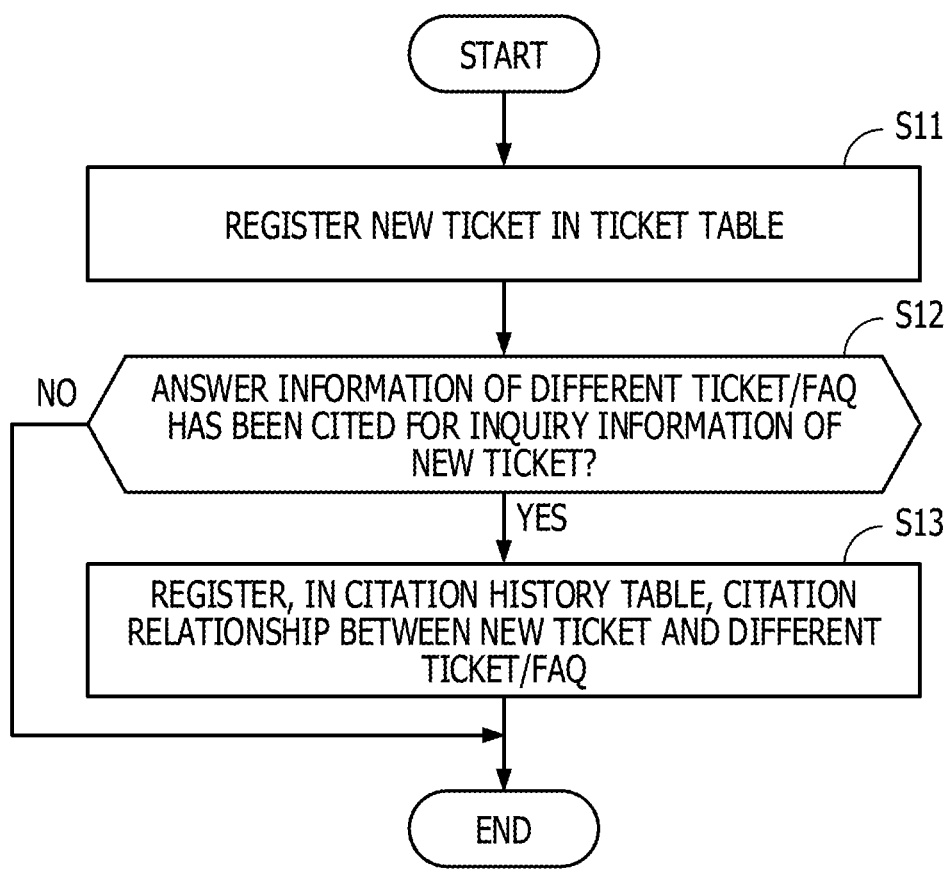
FIG. 10 is a diagram illustrating an exemplary ticket registration process flow according to the second embodiment.

FIG. 10 is a diagram illustrating an exemplary ticket registration process flow according to the second embodiment.

When answer information for the inquiry information of a new ticket is generated, the inquiry answering processor 110 of the server 100 performs the processes illustrated in FIG. 10. The processes illustrated in FIG. 10 will be described in step number order.

(S11) The inquiry answering processor 110 registers, in the ticket table 131, a new ticket including the inquiry information and the answer information for the inquiry information.

(S12) The inquiry answering processor 110 determines whether or not, in generating the answer information for the inquiry information of the new ticket, answer information has been cited from a ticket or a FAQ extracted as an answer candidate by the answer candidates extracting processor 120. If answer information has been cited, the inquiry answering processor 110 causes the process to proceed to step S13. If answer information has not been cited, the inquiry answering processor 110 ends the process.

(S13) The inquiry answering processor 110 registers, in the citation history table 133, the citation relationship between the new ticket and the ticket or FAQ determined to have been cited in step S12.

Figure 11:
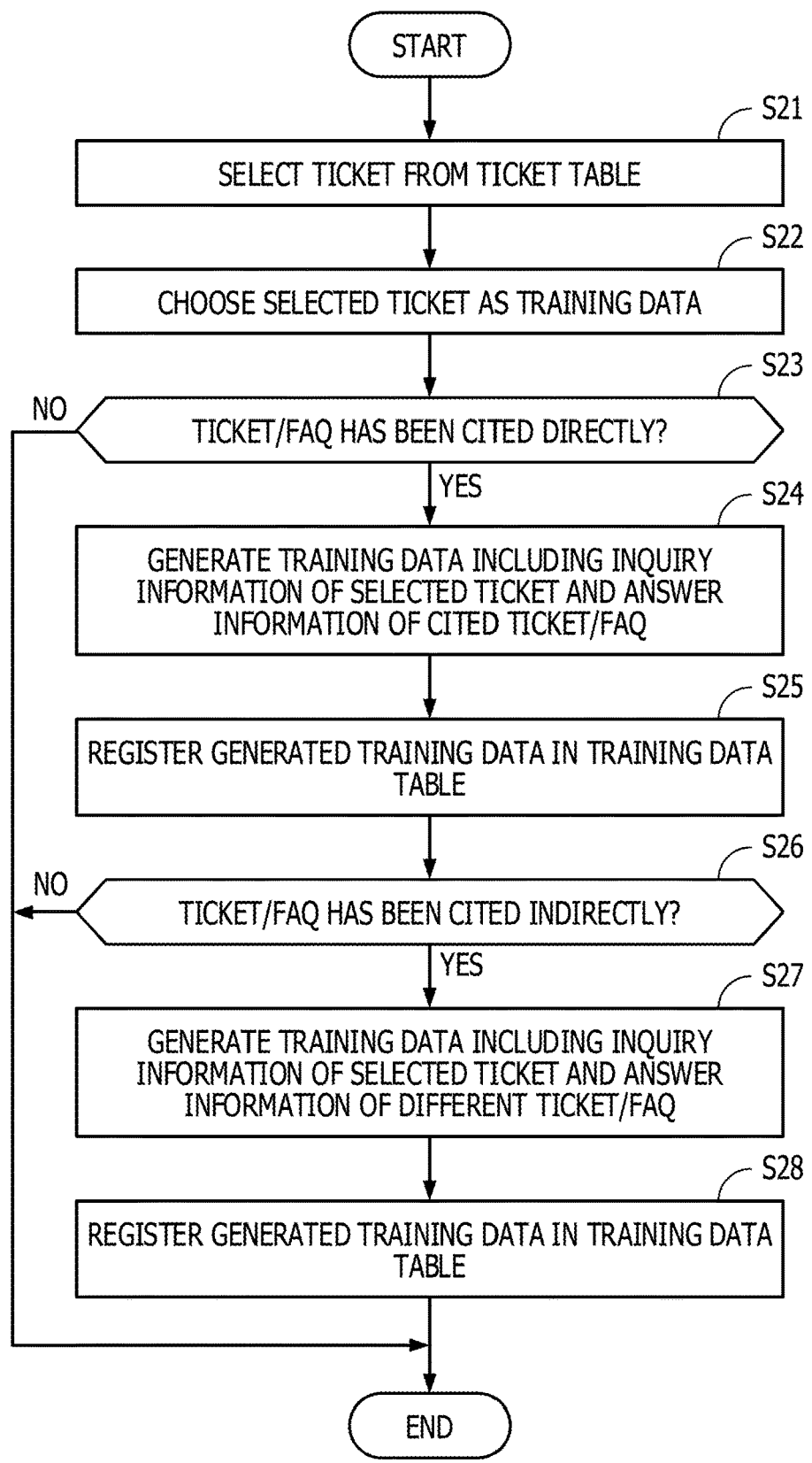
FIG. 11 is a diagram illustrating a first exemplary process flow of generating training data, according to the second embodiment.

FIG. 11 is a diagram illustrating a first exemplary process flow of generating training data, according to the second embodiment.

At a given timing of generating training data, the training data generating processor 140 of the server 100 performs the processes, as illustrated in FIG. 11, on each ticket that has been newly registered in the ticket table 131 after the previous timing of generating training data. For example, at the stage in which a certain number of tickets have been newly registered in the ticket table 131, the training data generating processor 140 performs the processes, as illustrated in FIG. 11, on each ticket that has been newly registered. The processes illustrated in FIG. 11 will be described below in step number order.

(S21) The training data generating processor 140 selects, from the ticket table 131, one of the tickets that have been newly registered. In this process, a ticket is selected in step number order.

(S22) The training data generating processor 140 chooses, as training data, the ticket selected in step S21. For example, in the ticket table 131, each ticket is provided with flag information indicating whether or not the ticket has been chosen as training data. In step S22, the flag information added to the selected ticket is updated from "0" to "1". In this case, in step S21, the earliest registered ticket is selected as a processing target from the tickets of which the flag information is set to "0".

(S23) The training data generating processor 140 refers to the citation history table 133, and determines whether or not a different ticket or a FAQ has been cited directly in generating the ticket selected in step S21. In this process, when a record in which the identification information of the ticket selected in step S21 is registered in the ticket name field is found in the citation history table 133, it is determined that a different ticket or a FAQ has been cited directly.

If a different ticket or a FAQ has been cited directly, the training data generating processor 140 causes the process to proceed to step S24. If a different ticket or a FAQ has not been cited directly, the training data generating processor 140 ends the process performed on the selected ticket.

(S24) The training data generating processor 140 generates training data including the inquiry information of the ticket selected in step S21 and the answer information of the different ticket or the FAQ registered in the cited ticket/FAQ name field of the record found in step S23.

(S25) The training data generating processor 140 registers, in the training data table 134, the training data generated in step S24.

(S26) The training data generating processor 140 refers to the citation history table 133, and determines whether or not a different ticket or FAQ has been cited indirectly in generating the ticket selected in step S21. In this process, it is determined whether or not the identification number of the ticket registered in the cited ticket/FAQ name field of the record found from the citation history table 133 in step S23 is registered in the ticket name field of an earlier registered record in the citation history table 133. If such a record is found from the citation history table 133, it is determined that a different ticket or FAQ has been cited indirectly.

If a different ticket or FAQ has been cited indirectly, the training data generating processor 140 causes the process to proceed to step S27. If a different ticket or FAQ has not been cited indirectly, the training data generating processor 140 ends the process performed on the selected ticket.

(S27) The training data generating processor 140 generates training data including the inquiry information of the ticket selected in step S21 and the answer information of the different ticket or FAQ registered in the cited ticket/FAQ name field of the record found in step S26.

(S28) The training data generating processor 140 registers, in the training data table 134, the training data generated in step S27.

Generating Training Data in Accordance with Generation of FAQs

Figure 12:
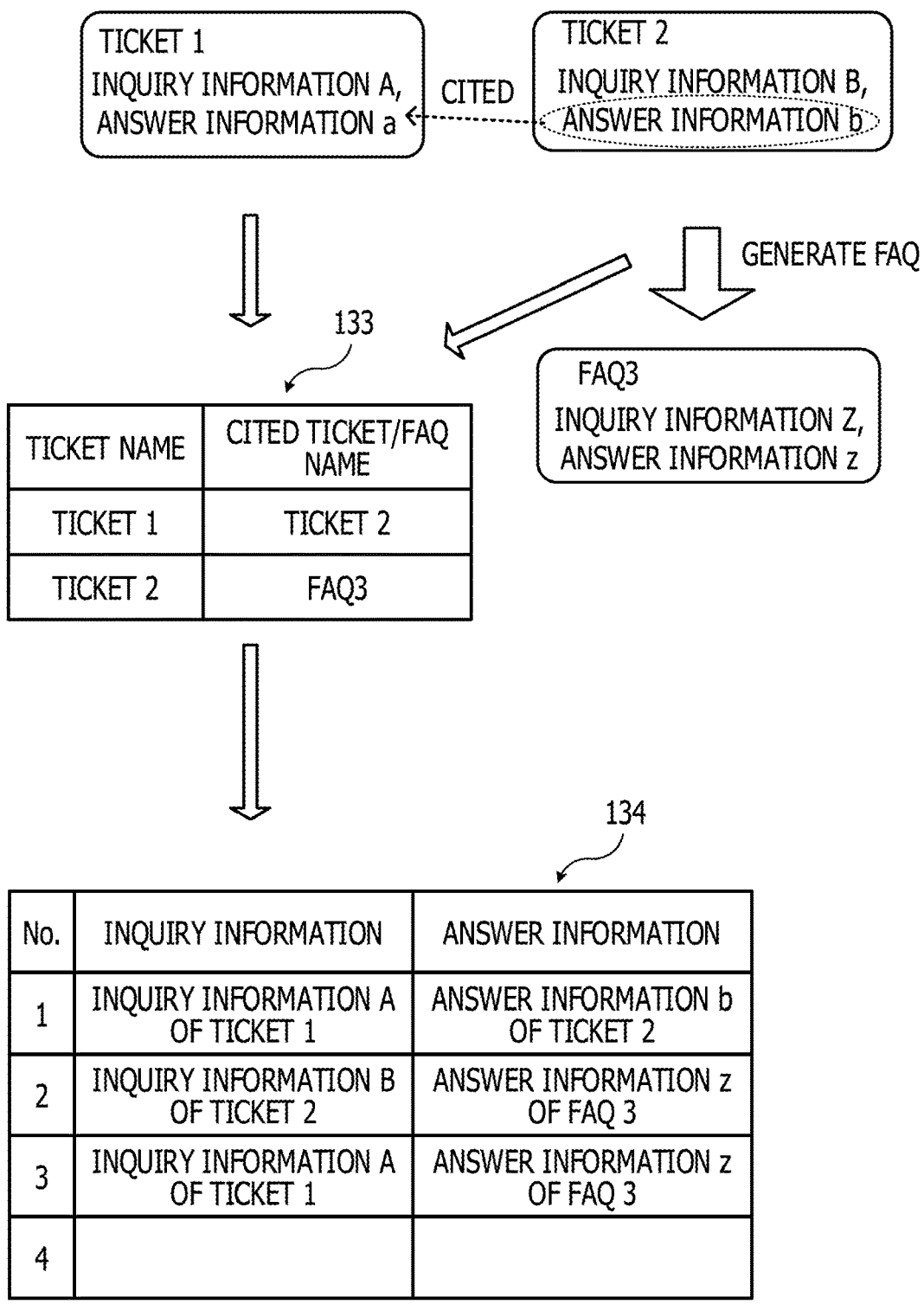
FIG. 12 is a diagram for describing an example of generating an answer and a frequently asked question (FAQ) in a server according to the second embodiment.

FIG. 12 is a diagram for describing an example of generating an answer and a FAQ, in the server according to the second embodiment.

For example, as illustrated in FIG. 12, assume that the answer information b of the ticket 2 has been cited as the answer information a for the inquiry information A of the ticket 1. The citation relationship between the ticket 1 and the ticket 2 having been cited from the ticket 1 is registered in the citation history table 133.

For example, when the answer information b of the ticket 2 is effective, for example, the answer information b has been cited as answer information of multiple tickets other than the ticket 1, a FAQ available to users is generated based on the content of the ticket 2. FIG. 12 illustrates the case in which a FAQ 3 including inquiry information Z and answer information z for the inquiry information Z is generated based on the content of the ticket 2. The inquiry information Z and the answer information z of the FAQ 3 may be obtained by copying the content of the inquiry information B and the content of the answer information b of the ticket 2, respectively, as they are, or may be obtained by appropriately editing the content of the inquiry information B and the content of the answer information b, respectively, of the ticket 2.

In this case, as illustrated in FIG. 12, the inquiry answering processor 110 transmits (issues), to the user, the answer information b for the inquiry information B of the ticket 2. At that time, the inquiry answering processor 110 registers, in the ticket table 131, the inquiry information B and its answer information b of the issued ticket 2.

After that, the inquiry answering processor 110 transmits (issues), to the user, the answer information a for the inquiry information A of the ticket 1. At that time, the inquiry answering processor 110 registers, in the ticket table 131, the inquiry information A and its answer information a of the issued ticket 1, and registers, in the citation history table 133, the citation relationship between the issued ticket 1 and the ticket 2 having been cited in generating the ticket 1.

After that, when the FAQ 3 is generated, the inquiry answering processor 110 registers, in the FAQ table 132, the inquiry information Z and its answer information z of the FAQ 3, and registers, in the citation history table 133, the citation relationship between the generated FAQ 3 and the ticket 2 having been cited in generating the FAQ 3. In the citation history table 133, the identification number of the ticket 2 is registered in the ticket name field, and the identification number of the FAQ 3 is registered in the cited ticket/FAQ name field.

In a timing of generating training data after that, the training data generating processor 140 chooses a newly registered FAQ as training data. At that time, the training data generating processor 140 refers to the citation history table 133, and determines whether or not a ticket has been cited in generating the new FAQ. In the example in FIG. 12, the ticket 2 has been cited in generating the FAQ 3. In this case, the answer information b of the ticket 2 and the answer information z of the FAQ 3 may be regarded as having a direct citation relationship. Therefore, the training data generating processor 140 generates training data including the inquiry information B of the ticket 2 and the answer information z of the FAQ 3, and registers the generated data in the training data table 134.

Further, the training data generating processor 140 refers to the citation history table 133, and determines whether or not the answer information b of the ticket 2 has been cited in generating the answer information of a different ticket. In the example in FIG. 12, the answer information b of the ticket 2 has been cited in generating the answer information a of the ticket 1. In this case, the answer information a of the ticket 1 and the answer information z of the FAQ 3 may be regarded as having an indirect citation relationship. Therefore, the training data generating processor 140 generates training data including the inquiry information A of the ticket 1 and the answer information z of the FAQ 3, and registers the generated data in the training data table 134.

As described above, when the generation of the FAQ 3 produces the citation relationships, as illustrated in FIG. 12, between the FAQ 3 and the ticket 1 and between the FAQ 3 and the ticket 2, in addition to training data obtained by copying the FAQ 3 itself, two pieces of training data based on the citation relationships are generated, and are accumulated in the storage unit 130. Thus, training data may be accumulated efficiently. This efficient accumulation of training data achieves efficient improvement in the learning accuracy of a learning process using the training data and in the accuracy of extracting answer information candidates for inquiry information transmitted from a user.

Figure 13:
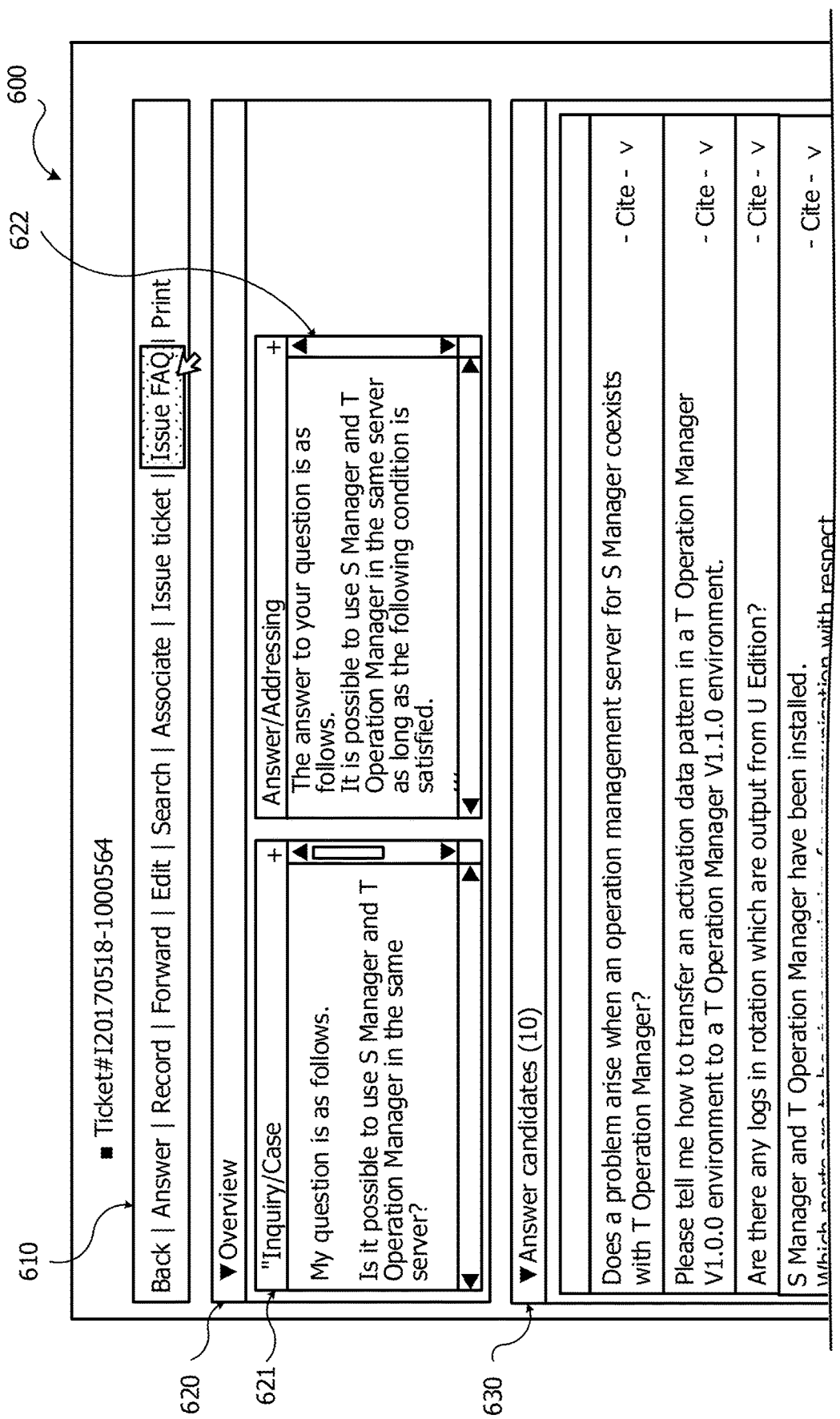
FIG. 13 is a diagram illustrating an exemplary screen displayed on an operator-side terminal apparatus connected to a server according to the second embodiment.

FIG. 13 is a diagram illustrating an exemplary screen displayed on an operator-side terminal apparatus connected to the server according to the second embodiment. In FIG. 13, identical components to those in FIG. 8 are designated with identical reference numerals.

The screen 600, as illustrated in FIG. 13, describing a ticket obtained by the server 100 is displayed on the display of the operator-side terminal apparatus 300. Similarly to FIG. 8, the screen 600 includes the tool bar 610 indicating operation menus to be performed, the "Overview" field 620 for the ticket, and the "Answer candidates" field 630.

For example, the content of the inquiry information of the ticket obtained by the server 100 is displayed in the "Inquiry/Case" field 621. Answer information candidates extracted based on the inquiry information are displayed in the "Answer candidates" field 630. As described above, an operator may input characters in the "Answer/Addressing" field 622 so as to generate answer information. Alternatively, one of the answer candidates displayed in the "Answer candidates" field 630 may be cited so as to generate answer information. When answer information has been generated and the operator selects "Answer" in the tool bar 610, the answer information displayed in the "Answer/Addressing" field 622 is transmitted to the user-side terminal apparatus 200a or the like through which the inquiry corresponding to of the inquiry information displayed in the "Inquiry/Case" field 621 has been transmitted. At that time, the ticket including the inquiry information and the cited answer information is registered in the ticket table 131. In this example, the "ticket 2" has been generated, and has been registered in the ticket table 131.

In this state, when the operator selects "Issue FAQ" in the tool bar 610, a FAQ including the inquiry information based on the information displayed in the "Inquiry/Case" field 621 and the answer information based on the information displayed in the "Answer/Addressing" field 622 is generated. In this example, assume that the "FAQ 3" is generated. In this case, the FAQ 3 is generated based on the ticket 2. In the generated FAQ 3, the content of the inquiry information and the content of the answer information may be obtained by copying the content of the inquiry information and the content of the answer information of the ticket 2, respectively, as they are. Alternatively, the content of the inquiry information and the content of the answer information may be obtained by appropriately editing the content of the inquiry information and the content of the answer information, respectively, of the ticket 2.

When the FAQ 3 is thus generated, the FAQ 3 is registered in the FAQ table 132, and the citation relationship between the FAQ 3 and the ticket 2 is registered in the citation history table 133.

Figure 14:
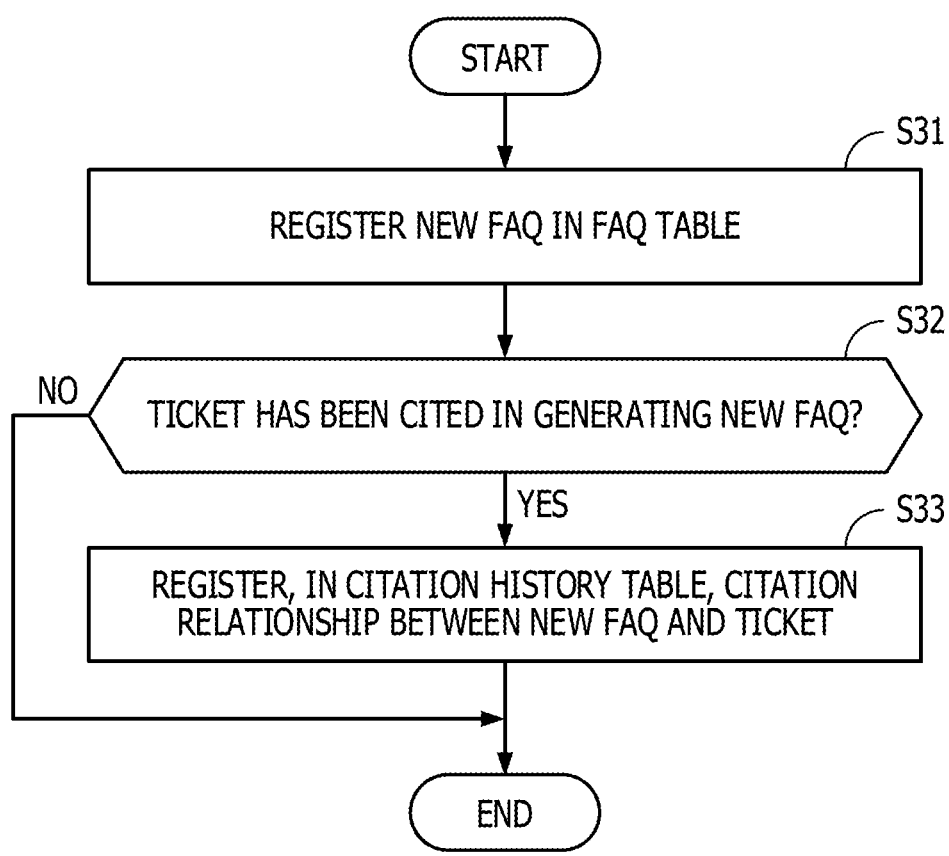
FIG. 14 is a diagram illustrating an exemplary FAQ registration process flow according to the second embodiment.

FIG. 14 is a diagram illustrating an exemplary FAQ registration process flow according to the second embodiment.

When a new FAQ is generated, the inquiry answering processor 110 of the server 100 performs the processes as illustrated in FIG. 14. The processes illustrated in FIG. 14 will be described below in step number order.

(S31) The inquiry answering processor 110 registers, in the FAQ table 132, a new FAQ including inquiry information and answer information for the inquiry information.

(S32) The inquiry answering processor 110 determines whether or not a ticket has been cited in generating the new FAQ. If a ticket has been cited, the inquiry answering processor 110 causes the process to proceed to step S33. If a ticket has not been cited, the inquiry answering processor 110 ends the process.

(S33) The inquiry answering processor 110 registers, in the citation history table 133, the citation relationship between the new FAQ and the ticket that is determined to have been cited in step S32.

Figure 15:
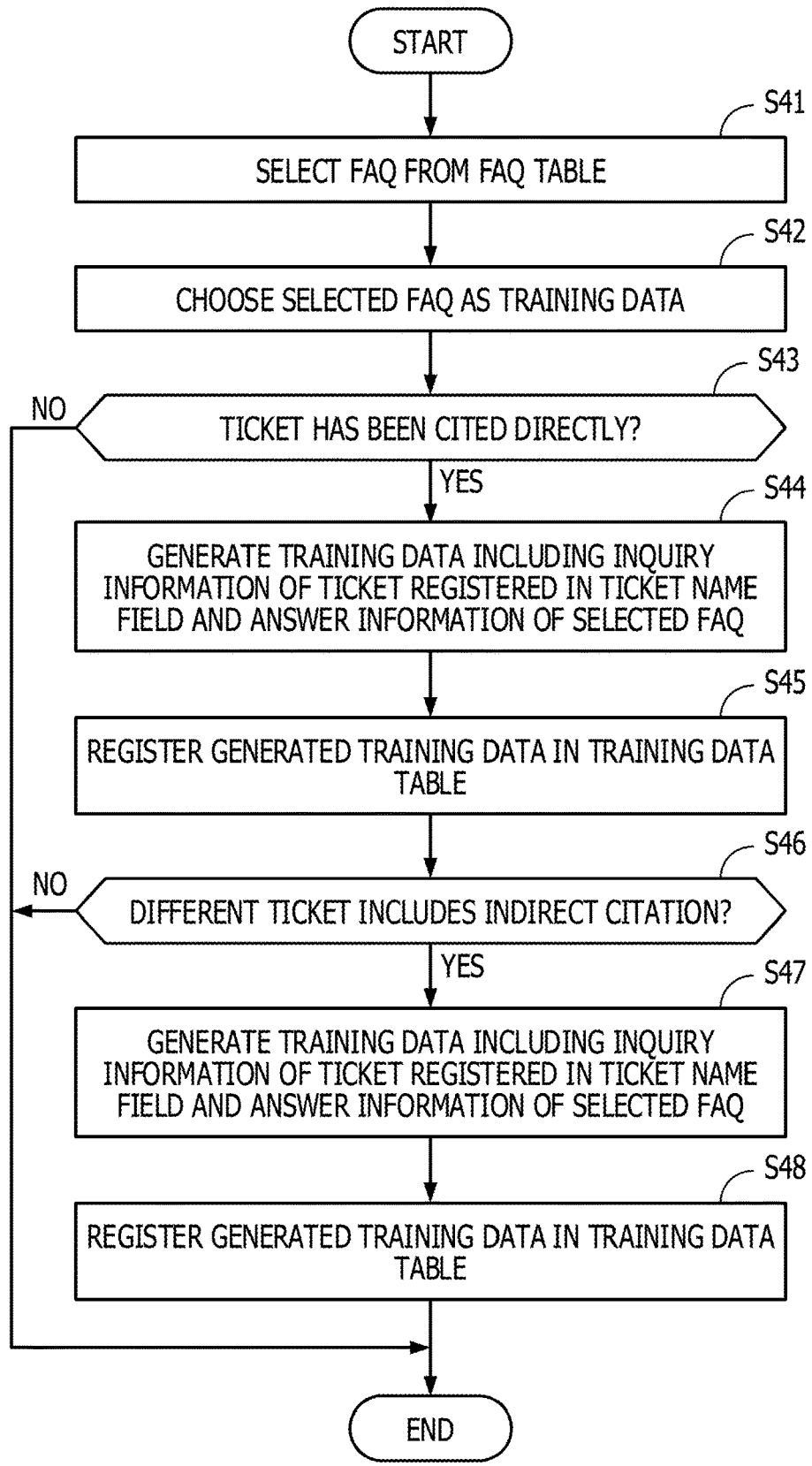
FIG. 15 is a diagram illustrating a second exemplary process flow of generating training data, according to the second embodiment.

FIG. 15 is a diagram illustrating a second exemplary process flow of generating training data, according to the second embodiment.

At a given timing of generating training data, the training data generating processor 140 of the server 100 performs the processes, as illustrated in FIG. 15, on each of the FAQs that have been newly registered in the FAQ table 132 after the previous timing of generating training data. For example, at the stage in which a certain number of FAQs have been newly registered in the FAQ table 132, the training data generating processor 140 performs the processes, as illustrated in FIG. 15, on each of the newly registered FAQs. The processes illustrated in FIG. 15 will be described below in step number order.

(S41) The training data generating processor 140 selects one of the newly registered FAQs from the FAQ table 132. In this process, a FAQ is selected in the order of registration.

(S42) The training data generating processor 140 chooses the FAQ, which is selected in step S41, as training data. For example, in the FAQ table 132, each FAQ is provided with flag information indicating whether or not the FAQ has been chosen as training data. In step S42, the flag information added to the selected FAQ is updated from "0" to "1". In this case, in step S41, the earliest registered FAQ is selected as a processing target from the FAQs of which the flag information is "0".

(S43) The training data generating processor 140 refers to the citation history table 133, and determines whether or not a ticket has been cited directly in generating the FAQ selected in step S41. In this process, when a record in which the identification information of the FAQ selected in step S41 is registered in the cited ticket/FAQ name field is found in the citation history table 133, it is determined that a ticket has been cited directly.

If a ticket has been cited directly, the training data generating processor 140 causes the process to proceed to step S44. If a ticket has not been cited directly, the training data generating processor 140 ends the process performed on the selected FAQ.

(S44) The training data generating processor 140 generates training data including the inquiry information of the ticket registered in the ticket name field of the record found in step S43 and the answer information of the FAQ selected in step S41.

(S45) The training data generating processor 140 registers, in the training data table 134, the training data generated in step S44.

(S46) The training data generating processor 140 refers to the citation history table 133, and determines whether or not a different ticket includes an indirect citation of the answer information of the FAQ selected in step S41. In this process, it is determined whether or not the identification number of the ticket registered in the ticket name field of the record found from the citation history table 133 in step S43 is registered in the cited ticket/FAQ name field of an earlier registered record in the citation history table 133. When such a record is found from the citation history table 133, it is determined that a different ticket includes an indirect citation from the answer information of the FAQ.

If a different ticket includes an indirect citation, the training data generating processor 140 causes the process to proceed to step S47. If no different tickets include an indirect citation, the training data generating processor 140 ends the process performed on the selected FAQ.

(S47) The training data generating processor 140 generates training data including the inquiry information of the ticket registered in the ticket name field of the record found in step S46 and the answer information of the FAQ selected in step S41.

(S48) The training data generating processor 140 registers, in the training data table 134, the training data generated in step S47.

Exemplary Modified Training Data Generation Process

In the process, which is illustrated in FIGS. 6 to 11, of generating training data in accordance with generation of tickets, training data is generated at a timing asynchronous to a ticket generation timing. Alternatively, as soon as a ticket is generated, training data may be generated based on the ticket. In this case, for example, the flowcharts in FIGS. 10 and 11 may be modified as follows.

The inquiry answering processor 110 first performs steps S11 to S13 in FIG. 10. Thus, a new ticket is registered in the ticket table 131. When the ticket is generated by citing a different ticket or a FAQ, information indicating the citation relationship is registered in the citation history table 133. Then, the training data generating processor 140 performs steps S22 to S28 in FIG. 11 by using the generated new ticket as a processing target. That is, in the processes in steps S22 to S28, the generated new ticket is used instead of the ticket selected in step S21. Thus, the process of generating training data based on a generated ticket is performed.

In the modified example described above, for example, in step S13, instead of registering, in the citation history table 133, the citation relationship between the new ticket and a different ticket or a FAQ having been cited in generating the new ticket, the inquiry answering processor 110 may hold the citation relationship in the RAM 102 temporarily. The information held at that time is also a type of citation history. When the process is thus modified, in step S23, the training data generating processor 140 determines whether or not a different ticket or a FAQ has been cited directly, based on a determination as to whether or not the information has been stored temporarily in step S13. When it is determined that a different ticket or a FAQ has been cited directly, in step S24, the training data generating processor 140 registers, in the citation history table 133, the information indicating the citation relationship, according to the procedure in step S13.

The record registered at that time is handled as a "record found from the citation history table 133 in step S23" in step S26.

In contrast, the process, which is illustrated in FIGS. 12 to 15, of generating training data in accordance with generation of FAQs, training data is generated at a timing asynchronous to a FAQ generation timing. Alternatively, as soon as a FAQ is generated, training data may be generated based on the FAQ. In this case, for example, the flowcharts in FIGS. 14 and 15 may be modified as follows.

The inquiry answering processor 110 first performs steps S31 to S33 in FIG. 14. Thus, a new FAQ is registered in the FAQ table 132. When the FAQ is generated by citing a ticket, information indicating the citation relationship is registered in the citation history table 133. Then, the training data generating processor 140 performs steps S42 to S48 in FIG. 15 by using the generated new FAQ as a processing target. That is, in steps S42 to S48, the generated new FAQ is used instead of the FAQ selected in step S41. Thus, training data is generated based on the generated FAQ.

Further, similarly to the above-described process of generating training data in accordance with generation of tickets, the modified example described above may employ, for example, the following process in step S33. Instead of registering, in the citation history table 133, the citation relationship between the new FAQ and a ticket having been cited in generating the new FAQ, the inquiry answering processor 110 holds the citation relationship in the RAM 102 temporarily. The information held at that time is also a type of citation history. When the process is thus modified, in step S43, the training data generating processor 140 determines whether or not a ticket has been cited directly, based on a determination as to whether or not the information has been held temporarily in step S33. When it is determined that a ticket has been cited directly, in step S44, the training data generating processor 140 registers, in the citation history table 133, the information indicating the citation relationship according to the procedure in step S33. The record registered at that time is handled as a "record found from the citation history table 133 in step S43" in step S46.

A Process of Automatically Proposing FAQs

The server 100 as described above may have a function of proposing generation of FAQs automatically to an operator by using the training data table 134. Herein, such a function will be described by referring to FIGS. 16 and 17.

Figure 16:
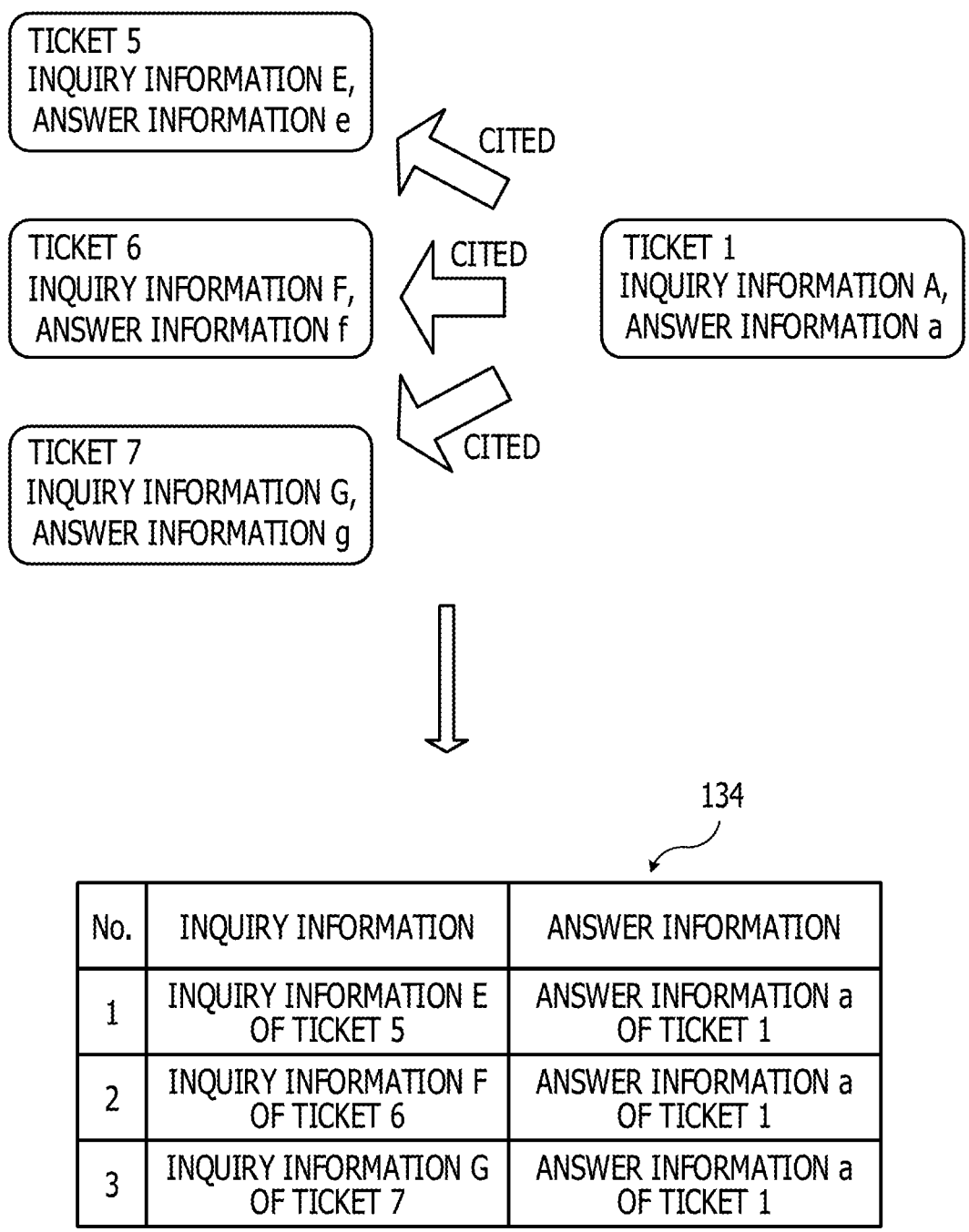
FIG. 16 is a diagram for describing an exemplary answer made in a server according to the second embodiment.

FIG. 16 is a diagram for describing exemplary answers in the server according to the second embodiment.

For example, as illustrated in the upper side of FIG. 16, assume that the answer information a of the ticket 1 has been cited, for example, in generating answer information e for inquiry information E of a ticket 5, in generating answer information f for inquiry information F of a ticket 6, and in generating answer information g for inquiry information G of a ticket 7. In this case, as illustrated in the lower side in FIG. 16, in the training data table 134, for example, the training data (No. 1) including the inquiry information E of the ticket 5 and the answer information a of the ticket 1, the training data (No. 2) including the inquiry information F of the ticket 6 and the answer information a of the ticket 1, and the training data (No. 3) including the inquiry information G of the ticket 7 and the answer information a of the ticket 1 are registered.

As in this example, when the same answer information of the ticket 1 has been cited many times in generating other tickets, the content of the ticket 1 which is a citation source is a content about which users transmit inquiries many times. Therefore, it may be determined that the content is desirably available as a FAQ. The number of citations from the answer information a may be found based on how many times the answer information a is registered in the answer information field of the training data table 134.

Accordingly, the FAQ automatic proposing processor 160 measures the number of registrations of the answer information of the same ticket registered in the answer information field of the training data table 134, that is, the number of citations from the same ticket. When a certain ticket is cited a certain number of times or more, the FAQ automatic proposing processor 160 automatically proposes, to an operator, generating a FAQ using the ticket.

Figure 17:
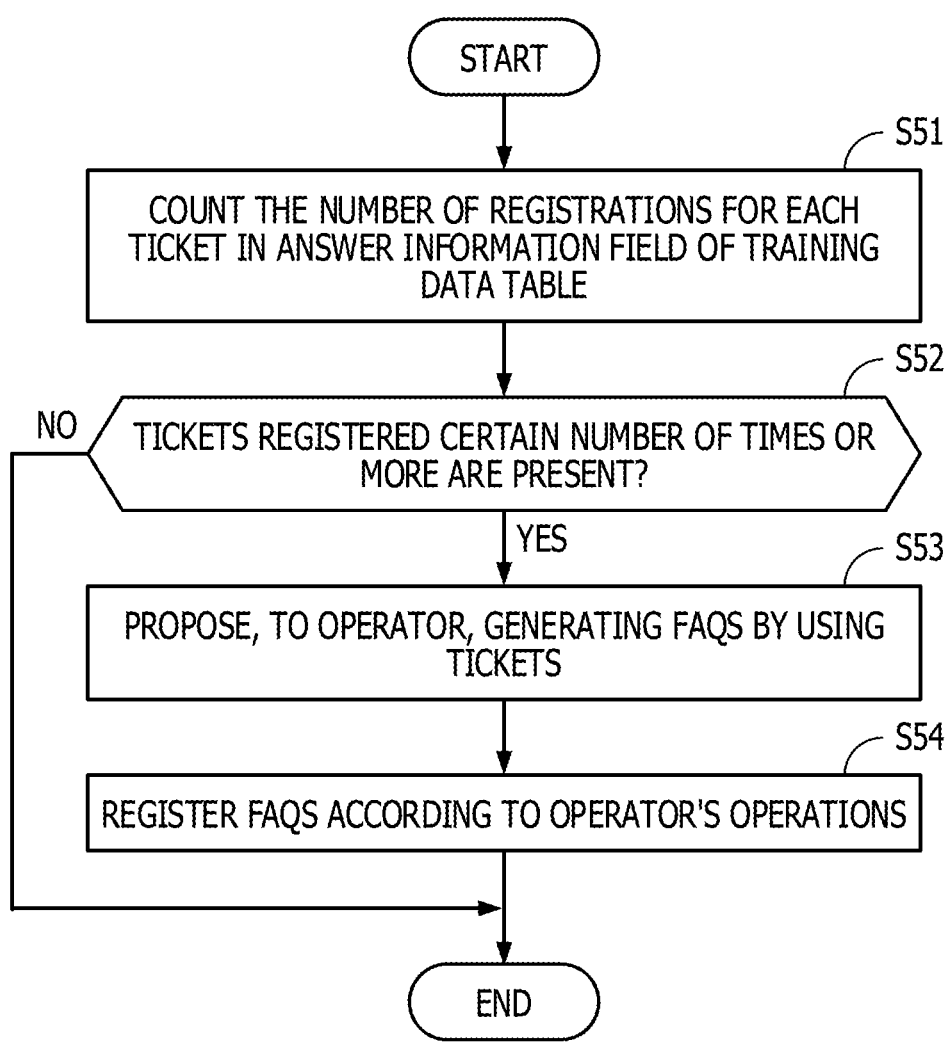
FIG. 17 is a diagram illustrating an exemplary process flow of automatically proposing FAQs, according to the second embodiment.

FIG. 17 is a diagram illustrating an exemplary process flow of automatically proposing FAQs, according to the second embodiment.

(S51) The FAQ automatic proposing processor 160 refers to the answer information field of the training data table 134, and counts the number of registrations for each ticket whose answer information is registered in the answer information field. Assume that, in the answer information field of the training data table 134, the content of answer information and the identification information of the ticket including the answer information are registered.

(S52) The FAQ automatic proposing processor 160 determines whether or not tickets, each of which is registered a certain number of times or more, are present, through the counting process in step S51. If such tickets are present, the FAQ automatic proposing processor 160 causes the process to proceed to step S53. If such tickets are not present, the FAQ automatic proposing processor 160 ends the process.

(S53) The FAQ automatic proposing processor 160 notifies an operator of proposal information for proposing generation of FAQs by using the tickets, which are registered a certain number of times or more, through the operator-side terminal apparatus 300.

(S54) When the operator performs an operation for generating FAQs, the FAQ automatic proposing processor 160 registers the generated FAQs in the FAQ table 132.

The processes described above enable the server 100 to automatically extract a ticket suitable for generation of a FAQ and to notify an operator of the ticket. This improves the efficiency of a FAQ generating operation performed by an operator. In addition, for example, instead of proposing generation of a FAQ using an extracted ticket, the FAQ automatic proposing processor 160 may automatically generate a FAQ by using the ticket and may register the generated FAQ in the FAQ table 132. In this case, FAQs may be generated efficiently.

In the processes in FIGS. 16 and 17, the FAQ automatic proposing processor 160 refers to the training data table 134 and determines tickets that have been cited a certain number of times or more. Alternatively, for example, the FAQ automatic proposing processor 160 may refer to the citation history table 133 instead of the training data table 134, and may determine tickets that have been cited a certain number of times or more. In this case, the FAQ automatic proposing processor 160 refers to the cited ticket/FAQ name field of the citation history table 133, and determines tickets registered a certain number of times or more. Thus, when the citation history table 133 is referred to, only tickets having been cited directly in generating different tickets are counted, and tickets having been cited indirectly are not counted.

A Learning Process and a Search Process for Answer Candidates

An exemplary learning process for extracting appropriate answer information for inquiry information, and an exemplary process of searching for answer information candidates for new inquiry information by using the results of the learning process will be described.

The learning process will be described. For example, assume that conversion parameters for converting keywords extracted from the inquiry information included in training data into keywords extracted from the answer information included in the training data are obtained through machine learning. As the training data, the tickets registered in the ticket table 131, the FAQs registered in the FAQ table 132, and the training data registered in the training data table 134 are used.

Figure 18:
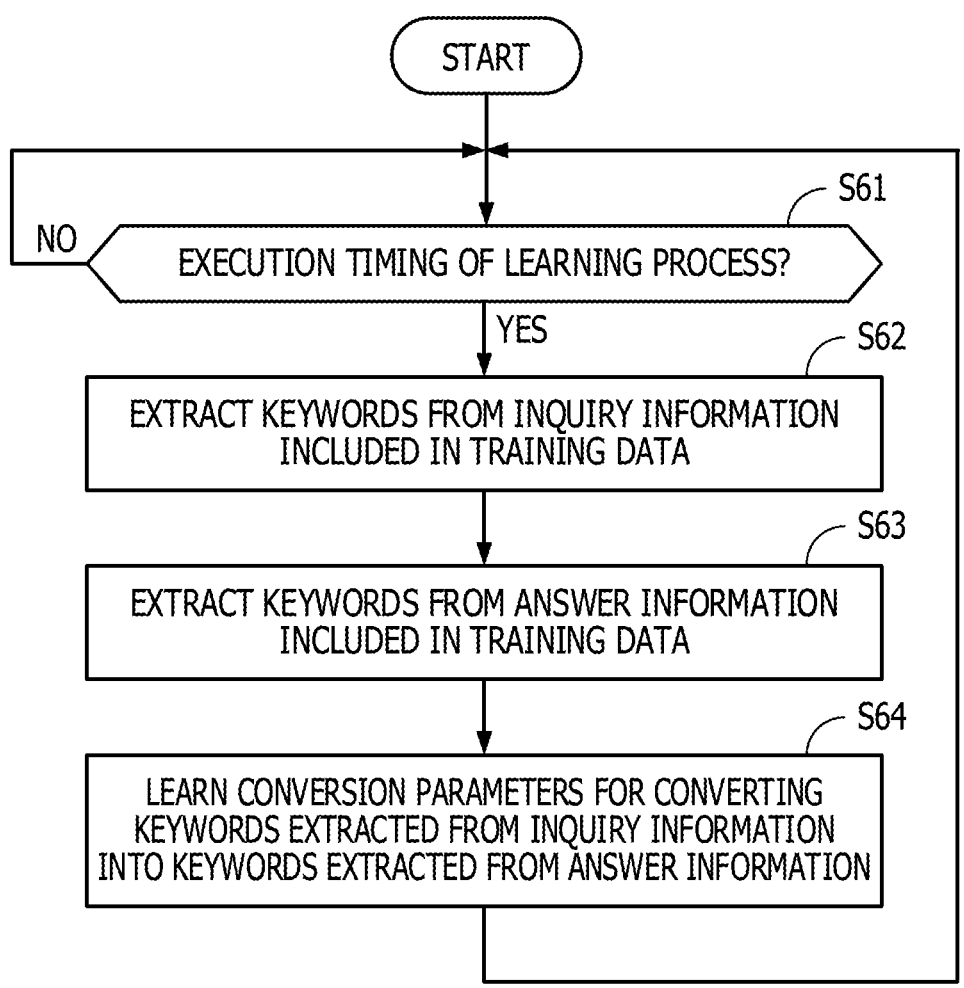
FIG. 18 is a diagram illustrating an exemplary learning process flow according to the second embodiment.

FIG. 18 is a diagram illustrating an exemplary learning process flow according to the second embodiment.

(S61) The learning processor 150 waits until an execution timing of the learning process comes. When an execution timing of the learning process comes, the learning processor 150 causes the process to proceed to step S62.

(S62) The learning processor 150 extracts keywords from the inquiry information included in the training data. For example, the learning processor 150 performs morpheme analysis on the inquiry information so as to extract keywords.

(S63) The learning processor 150 extracts keywords from the answer information included in the training data. For example, similarly in step S62, the learning processor 150 performs morpheme analysis on the answer information so as to extract keywords.

(S64) The learning processor 150 obtains, through machine learning, conversion parameters for converting the keywords extracted in step S62 into the keywords extracted in step S63. For example, the learning processor 150 gives, to a discriminant function, the keywords extracted in step S62 and the keywords extracted in step S63, as training data, so as to calculate conversion parameters. The learning processor 150 inputs, to the discriminant function, the keywords extracted in step S62 and the keywords extracted in step S63, so as to calculate conversion parameters. The learning processor 150 performs machine learning to obtain a conversion parameter for each combination of the corresponding keyword extracted from the inquiry information and the corresponding keyword extracted from the answer information.

FIG. 19 is a diagram illustrating an exemplary learning result table.

In the learning result table 135 illustrated in FIG. 19, items indicating the keywords extracted from the inquiry information in step S62 in FIG. 18 are listed in the vertical direction. Items indicating the keywords extracted from the answer information in step S63 in FIG. 18 are listed in the horizontal direction. In the learning result table 135, a conversion parameter obtained through the machine learning is registered for each combination of the corresponding keyword in the vertical-direction list and the corresponding keyword in the horizontal-direction list.

A process of searching for answer information candidates for new inquiry information will be described by referring to the learning result table 135.

Figure 20:
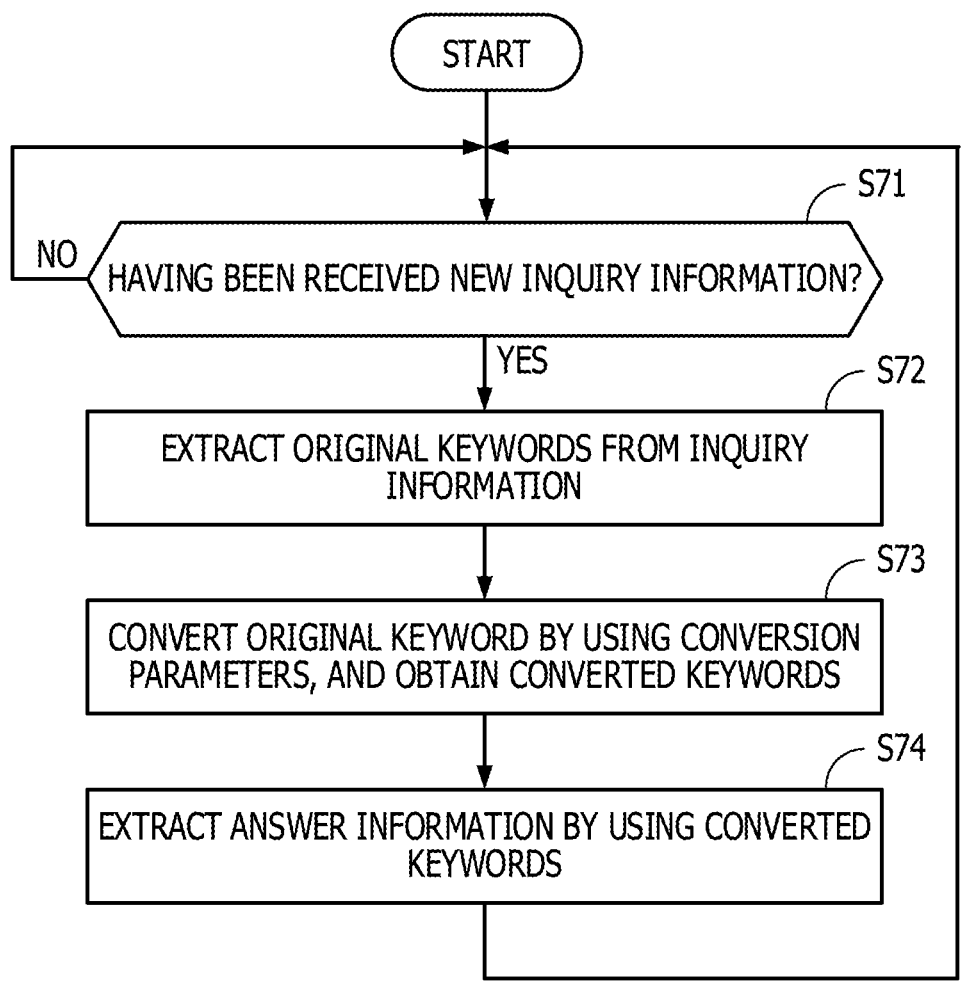
FIG. 20 is a diagram illustrating an exemplary process flow of searching for answer information, according to the second embodiment.

FIG. 20 is a diagram illustrating an exemplary process flow of searching for answer information, according to the second embodiment.

(S71) The answer candidates extracting processor 120 waits until the inquiry answering processor 110 receives new inquiry information from a user. When the inquiry answering processor 110 receives new inquiry information and the answer candidates extracting processor 120 is notified of the inquiry information, the answer candidates extracting processor 120 causes the process to proceed to step S72.

(S72) The answer candidates extracting processor 120 extracts keywords from the received inquiry information. For example, the answer candidates extracting processor 120 performs morpheme analysis on the received inquiry information so as to extract keywords. The extracted keywords are hereinafter called "original keyword".

(S73) The answer candidates extracting processor 120 uses the conversion parameters registered in the learning result table 135, so as to convert the original keyword extracted in step S72, and obtains converted keywords.

(S74) The answer candidates extracting processor 120 uses the converted keywords obtained in step S73, so as to search the ticket table 131 and the FAQ table 132. The answer candidates extracting processor 120 extracts a given number of pieces of answer information as a search result from pieces of answer information of the tickets registered in the ticket table 131 and the FAQs registered in the FAQ table 132. The answer candidates extracting processor 120 transmits, to the inquiry answering processor 110, tickets and FAQs including the extracted pieces of answer information. Thus, these tickets and FAQs are displayed in the "Answer candidates" field 630 of the screen 600 illustrated in FIG. 8.

A concrete example of the processes in steps S73 and S74 will be further described. For example, in step S73, the answer candidates extracting processor 120 calculates the degree of correlation with each original keyword extracted in step S72, for every keyword extracted from the answer information in step S63 in FIG. 18.

For example, assume that, as original keywords, "monitoring" and "condition" are extracted. The answer candidates extracting processor 120 refers to the rows in which "monitoring" and "condition" are set in the left-end item in the learning result table 135 illustrated in FIG. 19. The answer candidates extracting processor 120 obtains a conversion parameter between the original keyword of "monitoring" and each keyword which is set in the upper-end item, that is, each keyword extracted from the answer information of the training data. Similarly, a conversion parameter between the original keyword of "condition" and each keyword extracted from the answer information of the training data is obtained.

The answer candidates extracting processor 120 adds, to each other, the conversion parameters obtained for the same keyword extracted from the answer information of the training data, so as to calculate the degree of correlation between the new inquiry information and each keyword extracted from the answer information of the training data. For example, "0.3" is obtained as the conversion parameter between the original keyword of "monitoring" and the keyword of "event" extracted from the answer information of the training data. In addition, "0.3" is obtained as the conversion parameter between the original keyword of "condition" and the keyword of "event" extracted from the answer information of the training data. In this case, "0.6" is calculated as the degree of correlation between the new inquiry information and each keyword extracted from the answer information of the training data.

The answer candidates extracting processor 120 chooses, as a converted keyword, keywords, each of which has the degree of correlation exceeding a given threshold, from the keywords extracted from the answer information of the training data. The answer candidates extracting processor 120 searches the answer information of the tickets registered in the ticket table 131 and the answer information of the FAQs registered in the FAQ table 132 by using the converted keywords, which have been chosen, as a search key. The answer candidates extracting processor 120 finds, through the searching, a given number of pieces of answer information having a high evaluation value (for example, including more chosen converted keywords), and outputs, to the inquiry answering processor 110, the tickets and FAQs including the found answer information, as a search result.

Through the processes described above, tickets and FAQs including appropriate answer information candidates for newly received inquiry information may be searched for based on the machine learning results. As a result, an operator's operation of generating answer information may be supported, improving the efficiency of the operation.

The functions of the apparatuses described in the embodiments described above (for example, the training data generation apparatus 1 and the server 100) may be implemented by using a computer. In this case, programs describing the process of the functions that are to be provided for each apparatus are provided. The programs are executed by a computer so that the functions are implemented on the computer. The programs describing the process may be recorded in a computer-readable recording medium. Examples of a computer-readable recording medium include a magnetic storage device, an optical disk, a magneto-optical recording medium, and a semiconductor memory. Examples of a magnetic storage device include an HDD, a flexible disk, and a magnetic tape. Examples of an optical disk include a DVD, a digital versatile disc-random access memory (DVD-RAM), a compact disc-read only memory (CD-ROM), and a CD-recordable (R)/rewritable (RW). Examples of a magneto-optical recording medium include an MO disc.

When the programs are to be distributed, for example, a portable recording medium, such as a DVD or a CD-ROM, storing the programs is released onto the market. Alternatively, the programs may be stored in a storage device of a server computer, and the programs may be transferred from the server computer to other computers over a network.

A computer which executes the programs stores, in its storage device, for example, the programs recorded in a portable recording medium or the programs transferred from the server computer. The computer reads the programs from its storage device, and performs processes according to the programs. Alternatively, the computer may read the programs directly from a portable recording medium, and may perform the processes according to the programs. Alternatively, every time programs are transferred from the server computer connected over a network, the computer may perform processes according to the received programs.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable storage medium storing a training data generation program that causes a computer to execute a process of generating a plural pieces of training data to be used by a machine learning process for training a model configured to provide answer candidates for an inputted inquiry, the process comprising:

in response to selecting of a data pair including a first inquiry and a first answer corresponding to the first inquiry, generating first training data associating the first inquiry with the first answer to store the generated first training data to be used for training a model by the machine learning process, and obtaining a determination result by determining, based on history information, whether the history information includes one or more records indicating that one or more second answers have been cited by an operator in a time period from receiving the first inquiry to the selecting of the data pair, the history information including a plurality of records each of which indicates a citation history regarding any of pieces of answer information, each of the one or more second answers being an answer associated with a respective inquiry different from the first inquiry; and in response to the determination result indicating that the history information includes the one or more records indicating that the one or more second answers have been cited by an operator in a time period from receiving the first inquiry to the selecting of the data pair, generating, for each of the one or more second answers, second training data associating the first inquiry with that second answer to store the generated second training data to be used in conjunction with the generated first training data for the training of the model by the machine learning process, and generating the plural pieces of training data to be used in the machine learning process by combining the generated first training data and the generated second training data, to train the model by the machine learning process using the generated plural pieces of training data.

2. The non-transitory computer-readable storage medium according to claim 1, wherein the determining determines that the first answer information has been cited in the generation process when the first answer information has been cited in a generation process of third answer information and when the third answer information has been cited in the generation process of the second answer information.

3. The non-transitory computer-readable storage medium according to claim 1, wherein the determining determines that the first answer information has been cited in the generation process when the first answer information has been directly cited in the generation process of the second answer information.

4. The non-transitory computer-readable storage medium according to claim 1, the process further comprising:

generating a frequently asked question based on the first answer information, the frequently asked question including a second inquiry and fourth answer information corresponding to the second inquiry; and generating first training data and second training data, the first training data associating the second inquiry with the fourth answer information, the second training data associating the first inquiry with the fourth answer information.

5. The non-transitory computer-readable storage medium according to claim 1, wherein the process further comprises:

accumulating the generated training data in the storage device; and after pieces of training data is accumulated in the storage device, determining whether a predetermined number of training data determined to be cited in the determining and corresponding to a same answer information are stored in the storage device; and when the predetermined number of training data are stored in the storage device, outputting the predetermined number of training data as data candidates used to generate frequently asked questions.

6. A training data generation device comprising:
a memory; and
a processor coupled to the memory and the processor configured to execute a process of generating a plural pieces of training data to be used by a machine learning process for training a model configured to provide answer candidates for an inputted inquiry, the process including:
  in response to selecting of a data pair including a first inquiry and a first answer corresponding to the first inquiry,
  generating first training data associating the first inquiry with the first answer to store the generated first training data to be used for training a model by the machine learning process, and
  obtaining a determination result by determining, based on history information, whether the history information includes one or more records indicating that one or more second answers have been cited by an operator in a time period from receiving the first inquiry to the selecting of the data pair, the history information including a plurality of records each of which indicates a citation history regarding any of pieces of answer information, each of the one or more second answers being an answer associated with a respective inquiry different from the first inquiry; and
  in response to the determination result indicating that the history information includes the one or more records indicating that the one or more second answers have been cited by an operator in a time period from receiving the first inquiry to the selecting of the data pair,
  generating, for each of the one or more second answers, second training data associating the first inquiry with that second answer to store the generated second training data to be used in conjunction with the generated first training data for the training of the model by the machine learning process, and
  generating the plural pieces of training data to be used in the machine learning process by combining the generated first training data and the generated second training data, to train the model by the machine learning process using the generated plural pieces of training data.

7. A training data generation method executed by a computer of generating a plural pieces of training data to be used by a machine learning process for training a model configured to provide answer candidates for an inputted inquiry, the training data generation method comprising:
  in response to selecting of a data pair including a first inquiry and a first answer corresponding to the first inquiry,
  generating first training data associating the first inquiry with the first answer to store the generated first training data to be used for training a model by the machine learning process, and
  obtaining a determination result by determining, based on history information, whether the history information includes one or more records indicating that one or more second answers have been cited by an operator in a time period from receiving the first inquiry to the selecting of the data pair, the history information including a plurality of records each of which indicates a citation history regarding any of pieces of answer information, each of the one or more second answers being an answer associated with a respective inquiry different from the first inquiry; and
  in response to the determination result indicating that the history information includes the one or more records indicating that the one or more second answers have been cited by an operator in a time period from receiving the first inquiry to the selecting of the data pair,
  generating, for each of the one or more second answers, second training data associating the first inquiry with that second answer to store the generated second training data to be used in conjunction with the generated first training data for the training of the model by the machine learning process, and
  generating the plural pieces of training data to be used in the machine learning process by combining the generated first training data and the generated second training data, to train the model by the machine learning process using the generated plural pieces of training data.

* * * * *